US011508006B1

(12) United States Patent
Cross et al.

(10) Patent No.: US 11,508,006 B1
(45) Date of Patent: Nov. 22, 2022

(54) DIGITAL PROPERTY COLLATERAL PROTECTION

(71) Applicant: AON RISK SERVICES, INC. OF MARYLAND, New York, NY (US)

(72) Inventors: Peter Gerard Cross, Frisco, TX (US); Nicholas Joseph Chmielewski, Chicago, IL (US); Daniel Crouse, Seattle, WA (US); Brian Hinman, Fishkill, NY (US); Giles Humphrey ffolliott Harlow, Pembroke (BM); Martyn Frank Chattey, Devonshire (BM)

(73) Assignee: AON RISK SERVICES, INC. OF MARYLAND, New York, NY (US)

( * ) Notice: Subject to any disclaimer, the term of this patent is extended or adjusted under 35 U.S.C. 154(b) by 221 days.

(21) Appl. No.: 16/428,188

(22) Filed: May 31, 2019

(51) Int. Cl.
*G06Q 40/02* (2012.01)
*G06Q 50/18* (2012.01)

(52) U.S. Cl.
CPC ......... *G06Q 40/025* (2013.01); *G06Q 50/184* (2013.01)

(58) Field of Classification Search
CPC ............................ G06Q 40/025; G06Q 50/184
USPC ....................................................... 705/3–44
See application file for complete search history.

(56) References Cited

U.S. PATENT DOCUMENTS

| | | | | |
|---|---|---|---|---|
| 6,236,973 B1 * | 5/2001 | Dillard | .................. | G06Q 40/06 705/37 |
| 6,330,547 B1 * | 12/2001 | Martin | ................. | G06Q 40/025 705/38 |
| 7,158,989 B2 * | 1/2007 | Saltz | ................... | G06F 16/2462 707/700 |
| 8,090,635 B1 * | 1/2012 | Roitburg | ................ | G06Q 40/08 705/36 R |
| 8,311,912 B2 * | 11/2012 | Prieston | ................. | G06Q 40/08 705/35 |
| 8,583,525 B1 * | 11/2013 | Diaz | ...................... | G06Q 40/06 705/40 |
| 8,853,525 B2 * | 10/2014 | Beckerman | ............. | H02S 40/22 136/251 |
| 2005/0021434 A1 * | 1/2005 | D'Loren | ................ | G06Q 10/00 705/36 R |
| 2008/0154767 A1 * | 6/2008 | D'Agostino | ......... | G06Q 40/025 705/38 |

(Continued)

OTHER PUBLICATIONS

US 11,257,151 B2, 02/2022, Celia (withdrawn)*

(Continued)

*Primary Examiner* — Frantzy Poinvil
(74) *Attorney, Agent, or Firm* — Lee & Hayes, P.C.

(57) ABSTRACT

Systems and methods for digital property collateral protection are disclosed. For example, a pre-underwriting analysis may be performed to ascertain the quality of a given borrower and the intellectual property associated with the borrower. If the borrower passes the pre-underwriting analysis, an underwriting analysis including an intellectual property valuation may be performed. If the borrower passes the underwriting analysis and the terms of a loan and insurance policy are otherwise agreed upon, a lender may issue a loan to the borrower with the intellectual property as collateral, and an insurer may issue an insurance policy to the lender to insure against covered events.

11 Claims, 10 Drawing Sheets

(56) References Cited

U.S. PATENT DOCUMENTS

| | | | |
|---|---|---|---|
| 2009/0030853 A1* | 1/2009 | De La Motte | G06Q 40/06 705/36 R |
| 2010/0010874 A1* | 1/2010 | Howard | G06Q 40/02 705/38 |
| 2010/0153272 A1* | 6/2010 | Wentker | G06F 21/33 455/410 |
| 2011/0289021 A1* | 11/2011 | Fletcher | G06Q 40/06 705/500 |
| 2020/0042989 A1* | 2/2020 | Ramadoss | G06Q 20/065 |
| 2021/0004921 A1* | 1/2021 | Lee | G06Q 30/0627 |
| 2021/0342836 A1* | 11/2021 | Celia | G06Q 50/01 |

OTHER PUBLICATIONS

Herkoshkowitz, "Anew vision for valuation: what if there was simple FICO-like for property valuation? It could dramatically change the risk associated with collateral, And it's closer than you think", Mortgage Bankin 65:1: 138(6), Mortgage Bankers Association of America, (Oct. 2004).*

Arya, et al., "Popwering Innovation: An Accessible model for intellectual property rights based financing in India", 1 1 Research Officers, State Bank institute of Consumer Banking, Hyderabad, Vinimaya 42.1: 48-58, National Institute of Bank Management. (Year: 2002).*

* cited by examiner

1000

```
┌─────────────────────────────────────────────────────────────────────┐
│ Generate, based at least in part on first quality indicator of borrower and second │
│ quality indicator of intellectual property associated with borrower, recommendation │
│       that loan be insured with intellectual property as collateral for loan       │
│                                        1002                                        │
└─────────────────────────────────────────────────────────────────────┘
                                       │
                                       ▼
┌─────────────────────────────────────────────────────────────────────┐
│       Send recommendation to computing device associated with lender or insurer     │
│                                        1004                                        │
└─────────────────────────────────────────────────────────────────────┘
                                       │
                                       ▼
┌─────────────────────────────────────────────────────────────────────┐
│ Receive indication that insurance policy has been issued by insurer to lender for loan │
│                    with intellectual property as collateral                        │
│                                        1006                                        │
└─────────────────────────────────────────────────────────────────────┘
```

FIG. 10

DIGITAL PROPERTY COLLATERAL PROTECTION

BACKGROUND

Intellectual property has been a valued asset class for individuals and business for some time. However, unlike other asset classes, use of intellectual property rights has been limited. Described herein are improvements in technology and solutions to technical problems that can be used to, among other things, increase the ability and type of uses of intellectual property and/or other digital property.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 10 illustrates a flow diagram of another example process for digital property collateral protection.

DETAILED DESCRIPTION

Figure 1:
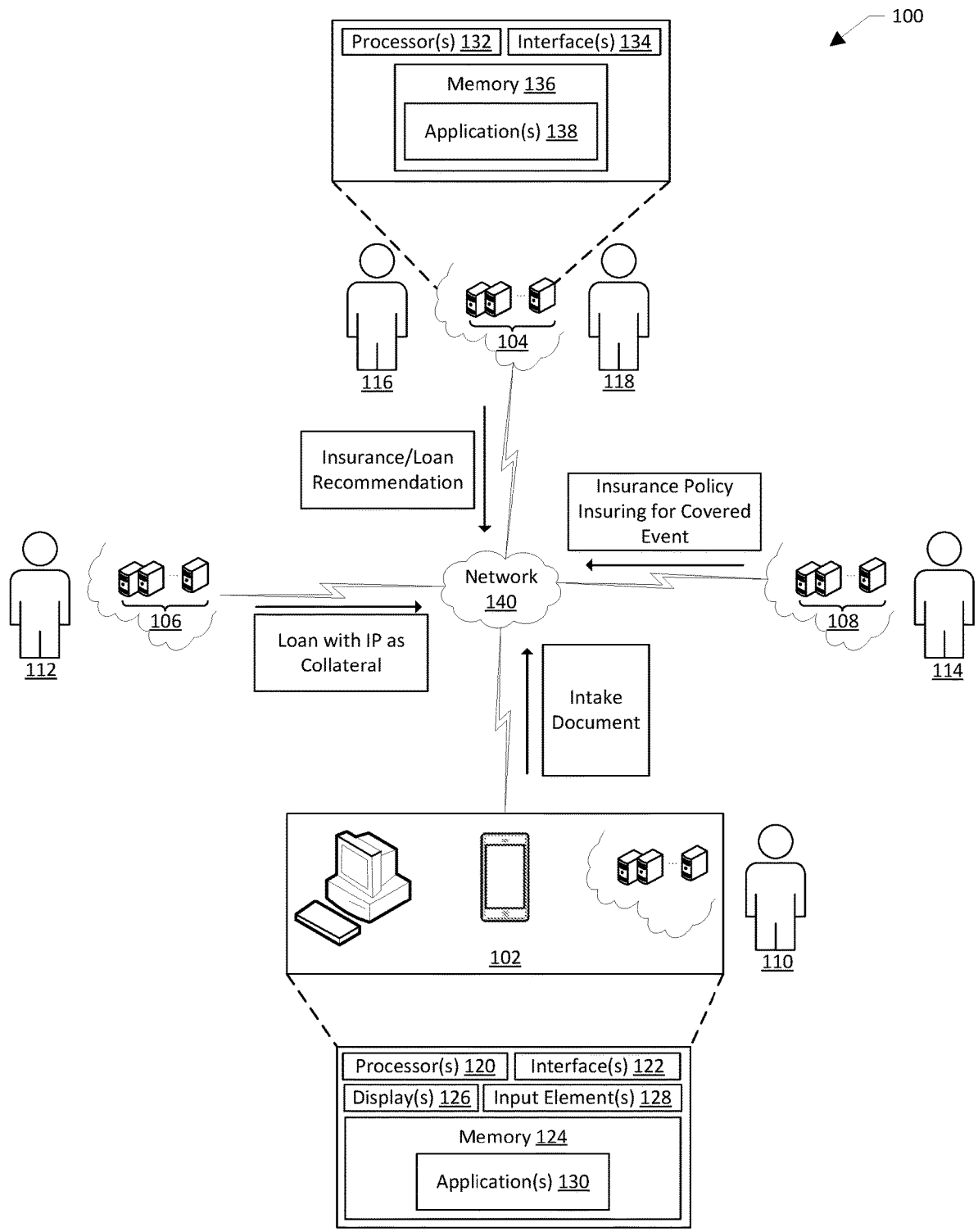
FIG. 1 illustrates a schematic diagram of an example architecture for digital property collateral protection.

Systems and methods for digital property collateral protection are disclosed. Take, for example, a company or individual, described herein as an entity, that owns one or more intellectual property assets. The intellectual property assets may include, for example, patents, copyrights, trademarks and/or brands, and/or trade secrets. The entity may desire to acquire funding, but instead of seeking funding via equity financing, the entity may desire to acquire a loan, such as from a lender. Generally, a lender will request or require that, in exchange for lending money to the entity, also described herein as the borrower, that the borrower offer up one or more assets as collateral against the loan. In these dealings, the lender will provide a monetary amount to the borrower and the borrower may pay back the loan over a certain period of time, plus interest. If a covered and/or named event occurs pursuant to the terms of the loan, or if the borrower otherwise does not comply with the terms of the loan, the lender may seize and/or acquire the assets put up as collateral and/or the lender may liquidate the assets to recoup some or all of the loaned amount. However, some borrowers may not have sufficient tangible property to put up as collateral for a loan, and/or some borrowers may own substantial intellectual property assets that could be used as collateral, but lenders may not desire to collateralize such intellectual property assets given current systems and methodologies to analyze whether such a loan would be advisable. It should be understood that a covered and/or named event may include one or more events and/or occurrences enumerated in the terms of a loan. Those events may include, for example, a drop in the value of digital property, a reputation-related event, a failure to pay, etc.

The innovations described herein provide systems for digital property collateral protection that, among other things, enables borrowers to offer up intellectual property as collateral for a loan and for lenders to acquire an insurance policy that protects insurers if a covered event occurs and the collateralized intellectual property does not satisfy the debt owed under the loan. For example, a borrower may approach a lender for a loan. As part of the intake process for determining whether the borrower will be awarded a loan, the borrower and the lender may determine that intellectual property assets of the borrower are potential assets to be used as collateral for the loan. In these examples, the borrower and/or the lender may engage with a broker, such as an insurance broker, in examples, to initiate the process of determining whether the borrower and its intellectual property are candidates for a loan where the intellectual property is used as collateral.

The broker and/or the lender may send a discovery document to the borrower. The discovery document, also described herein as an intake document, may request information associated with the borrower and the intellectual property associated with the borrower. For example, the discovery document may request information such as the borrower's name and industry, corporate structure, past ability to receive funding from a venture capital entity and/or a private equity source, corporate ownership structure and/or composition, identification of equity investors and their respective holdings, borrower valuation, pending offers of equity investment, revenue numbers, profit numbers, current contracts that are material to continued and/or initial revenue and/or profits, long-term company goals and/or growth routes, identification of the owner(s) of intellectual property associated with the borrower, assignment documents associated with the intellectual property, and specific information associated with the intellectual property. The information associated with the intellectual property may include a description of the intellectual property associated with the borrowers, identifiers of the intellectual property and/or registration of the intellectual property, the countries in which the intellectual property is protected, a description of the borrower's intellectual property strategy, identification of the individuals and/or firms responsible for management and/or oversight of the borrower's intellectual property portfolio, estimated revenue and profit attributable to the intellectual property, identification and description of intellectual property licensing to third parties, historical exercise of intellectual property rights associated with products and/or services offered by the borrower, description of how revenues and/or profits from intellectual property are distributed by business segment and/or by country, previous valuations of the intellectual property, copies of licenses and/or agreements related to the intellectual property, identification of any known, unlicensed third-party use of the intellectual property, identification of any intellectual property that has been threatened, challenged, and/or subject to administrative and/or judicial actions, copies of standard employment contracts and identification of assignment provisions in those employment contracts, identification of key employees associated with the intellectual property and whether those employees have left the borrower, the borrower's licensing of third-party intellectual property, procedures to avoid infringement of third-party intellectual property rights, whether the borrower has insurance for theft of intellectual property and/or liability for infringement of third-party intellectual property, identification of potential purchasers of the intellectual property, and/or identification of key competitors. Additionally, in examples, the discovery document may request transactional information, such as the amount of the loan sought, an intended use for loan proceeds, identification of the lender, and/or alternative plans if the loan or collateral protection insurance is not available under the terms desired by the borrower.

The discovery document, as completed by the borrower and/or lender, and/or information requested by the discovery document, may be sent to the broker. Additionally, in examples, the broker may acquire additional information associated with the borrower, the lender, and/or the intellectual property such as from publicly-available information sources and/or sources associated with the borrower and/or the lender. The broker may utilize some or all of the information described herein for a pre-underwriting analysis.

The pre-underwriting analysis may include, for example, a broking analysis and a qualitative valuation analysis. To perform one or more of these analyses, loan-origination data, also described herein as a loan-origination mix, may be identified, determined, and/or generated. The loan-origination data may include business-sector information, business-size information, and/or intellectual property content. The business-sector information may indicate, for example, one or more business sectors associated with the borrower. By way of example, the business sectors may include a technology sector, industrial sector, entertainment sector, medical sector, etc. In examples, a borrower may be associated with one sector or with multiple sectors. The business-size information may indicate, for example, an amount of revenue, a number of employees, and/or an amount of profit associated with the borrower. The intellectual property content may include identifiers of the intellectual property assets associated with the borrower as well as the type of intellectual property assets, such as patents, trade secrets, trademarks, copyrights, etc. This loan-origination data may be identified, determined, and/or generated utilizing the information from the discovery document and/or the publicly-available resources.

The loan-origination data may be utilized to identify, determine, and/or generate insurance-input data. The insurance-input data may include, for example, IP-criticality information, market-share information, and/or IP-prevalence information. The IP-criticality information may provide an indication of how critical intellectual property is to the borrower and/or the borrower's business model. For example, a borrower operating in the technology sector will be associated with a higher level of IP-criticality than, for example, a borrower operating in the food sector. The market-share information may provide an indication of the relative share of the market of the borrower with respect to one or more competitors in the industry and/or industries. The IP-prevalence information may provide an indication of the general composition of the intellectual property associated with the borrower. For example, the IP-prevalence information may indicate that the borrower is associated with 100 intellectual property assets, with 75 of those assets being patents, 10 of the assets being trademark registrations, 10 of the assets being copyright registrations, and 5 of the assets being trade secrets, which may or may not have been registered with a trade secret registry. This information may indicate that the prevalence of patents associated with the borrower is relatively high with respect to the other intellectual property assets.

The loan-origination data and/or the insurance-input data may be utilized to perform the broking analysis described herein. For example, the broker and/or a system associated with the broker may utilize the loan-origination data and/or the insurance-input data to identify and/or determine an ownership structure of the borrower, previous debt and/or equity arrangements associated with the borrower, the type and/or number of intellectual property assets, an amount of revenue generated from the intellectual property assets, an amount of the loan sought, and/or a plan for loan funds. At this point, one or more reasons for declination of the loan and/or insurance policy may be identified and/or determined from the broking analysis. For example, the borrower may be declined if one or more of the following exemplary determinations are made: the borrower has no or little contracted revenue; there are no or inadequate equity finance alternatives; the borrower does not own the intellectual property; the ownership structure of the borrower indicates the presence of corporate and/or venture capital investors; the owners and/or principals of the borrower do not have sufficient financial and/or business interest in the borrower; the intellectual property is unsubstantial; and/or the intellectual property does not cover the products and/or services offered by the business. However, in other examples, the borrower may pass or otherwise be cleared through the broking analysis.

For those borrowers that clear the broking analysis, the qualitative valuation analysis may be performed utilizing the loan-origination data and/or the insurance-input data and/or the results from the broking analysis. For example, the qualitative valuation analysis may include identifying and/or determining information such as whether the intellectual property is owned by the borrower, whether there are any disputes involving the intellectual property, whether those disputes appear unfavorable, whether the intellectual property is proven to at least have a potential to generate profit and/or revenue, whether the intellectual property assets appear insubstantial relative to the business and/or loan, whether the intellectual property is aligned with the business, the status of the intellectual property assets, the degree of intellectual property asset commercialization, and/or the presence of licensing agreements associated with the intellectual property. Additionally, in some examples, one or more priorities of the broker may be applied to the qualitative valuation analysis. Those priorities may include the intellectual property portfolios having at least a threshold number of patents in a given country, patent coverage in other countries and particularly in countries associated with the business of the borrower, whether the intellectual property portfolio is growing and/or a rate of growth, licensing revenue thresholds, and/or sufficient secondary fields of use for the intellectual property.

The broking analysis and the qualitative valuation analysis may be utilized to make a pre-underwriting viability determination on whether the borrower is a good candidate to receive the loan with the intellectual property as collateral and/or whether the insurance policy should be issued. In examples, the pre-underwriting process may result in a score associated with the broking and qualitative valuation analyses and that score may be compared to one or more threshold scores to determine the viability of the borrower for the loan and/or for the insurance policy to issue. In other examples, the viability determination may include the information generated by the broking and/or qualitative valuation analyses and a recommendation of the positives and/or negatives associated with such a deal.

For those potential deals that pass the pre-underwriting analysis, an underwriting analysis may be performed. The underwriting analysis may include one or more steps and/or operations, which may or may not be performed in the order described below. For example, the underwriting analysis may include field underwriting of the borrower, the loan, and/or the intellectual property. For example, this portion of the underwriting process may include resolution of questions raised in the discovery document to provide an initial indication of the value of the intellectual property, such as, for example, a current or contracted cash flow associated with the intellectual property. The underwriting analysis may also include providing an initial indication of the value of the intellectual property. The initial indication may be based at least in part on a qualitative assessment and/or a quantitative assessment of the intellectual property value. In this portion of the underwriting analysis, the value may include multiple values, such as a suggested value, a fair market assessment, a maximum value, a minimum value, etc., and the values may be determined using one or multiple methodologies. This information may be utilized to inform whether to proceed with the loan deal. During the qualitative intellectual property review, factors such as the degree of coverage, the amount of opportunity, and/or exposure risks may be evaluated and determined. For example, coverage of the intellectual property may include an amount of technological space and/or a number of ideas and/or innovations owned by virtue of the intellectual property. Additionally, exposure may include a number of competitors, intellectual property assets held by such competitors, and/or a level of litigiousness attributable to such competitors. Generally, a favorable qualitative intellectual property review will include good coverage by the intellectual property, expansive opportunity to grow and/or maintain coverage, and low exposure. Additionally, the valuation may be based at least in part on an intellectual property environment review, which may utilize worldwide and/or country-specific intellectual property data and/or financial data associated with the borrower. This information may be utilized to perform a global intellectual property assessment, the valuation, and/or a mapping of the intellectual property to the borrower's products and/or services. The qualitative intellectual property review, the quantitative intellectual property review, and/or the intellectual property environment review may be utilized to generate an intellectual property valuation report, which may indicate the value(s) of the intellectual property and/or factors associated with the valuation.

The underwriting analysis may also include engagement with the borrower, the lender, and/or insurer, including the provision of applications to complete the loan and/or insurance policy. The broker may collect the applications, as completed, and supporting documentation, and may provide the valuation to one or more of the parties to the deal. The underwriting analysis may also include determining the terms of the loan and acceptance and/or review of a credit file associated with the borrower to identify whether the loan and insurance policy includes provisions that allow for the transfer of intellectual property if certain conditions in the loan are met. The lien associated with the deal may also be secured at this point. For example, a lien may provide a creditor with a legal right to easily obtain permission from a court to notify a borrower that an asset is being prepared to be seized based on the occurrence of an event. The lien may be recorded or otherwise perfected in examples.

The underwriting analysis may also include providing an estimated price and desired limits with insurance carriers and/or engaging intellectual property holders as needed to support and validate intellectual property valuations. The underwriting analysis may also include monitoring intellectual property assets (and/or monitoring key employees, marketplaces, licensing deals, litigation, and/or intellectual property portfolio revenue performance during the underwriting period).

The underwriting analysis may also include identifying, determining, and/or generating a loan structure between the borrower and the lender. The loan structure may indicate a value of the intellectual property, such as from the valuation described above. The loan structure may also include a value discount, which may represent a portion of the value of the intellectual property and may be based at least in part on one or more factors, such as the quality of the intellectual property, the quality of the borrower, and/or one or more constraints as set by the lender. A maximum loan amount may be identified and/or determined based at least in part on the difference between the value and the value discount. For example, the value of the intellectual property may be $28 million, and the value discount may be, for example, $8 million. In this example, the maximum loan amount may be $20 million, which is the difference between the $28 million value of the intellectual property and the $8 million value discount. Additionally, the loan structure may include a benchmark holdback amount, which may be a certain amount of the maximum loan that is held back by the lender and is provided to the borrower only if the borrower meets or exceeds certain benchmarks, such revenue goals, asset growth, etc. Staying with the example utilized herein, the benchmark holdback amount may be, for example, $6 million. In this example, the initial loan amount, which may include accrued interest, may be $14 million, which is the difference between the $20 million maximum loan amount and the $6 million benchmark holdback amount. Additionally, an indication of the amount of interest associated with the loan may be provided. For example, the interest may be $2 million. In this example, the insurer may issue an insurance policy with a maximum insurance payout of $12 million, which is the difference between the $14 million initial loan amount and the $2 million interest amount. As such, if all parties are in agreement, the loan may issue, and the borrower may be provided the $14 million initial loan amount (including accrued interest) by the lender, and the insurer may issue the insurance policy to the lender with the maximum insurance payout of $12 million.

In examples, the systems and/or individuals that are involved in the broking process may be separated and/or otherwise isolated from the systems and/or individuals that are involved in the qualitative valuation process. In these examples, a communication barrier may be established between the broking team and the valuation team such that an independent evaluation at each step may be performed. The communication barrier may include at least one of a policy or a technology mechanism, such as access controls and/or firewalls, configured to reduce communication between the broking team and the valuation team.

Additionally, one or more processes may be performed subsequent to the issuing of the loan and/or the insurance policy. For example, the borrower, the lender, and/or the intellectual property may be monitored, such as by the broker, to determine if a material change has occurred that would impact the loan and/or the insurance policy. Such material changes may include the occurrence of one or more impairment triggers, such as a legal claim involving the borrower and/or the intellectual property, a government action involving the borrower and/or the intellectual property, a third-party action involving the borrower and/or the intellectual property, a reputational event, a borrower-commenced legal action, and/or a bankruptcy event associated with a licensee. When such an event occurs, and/or when periodic monitoring reveals a decrease in the value of the intellectual property, a report and/or other notification may be sent to the borrower, the lender, and/or the insurer.

In addition to the impairment triggers described above, the borrower may also not comply with the terms of the loan in one or more respects. In these examples, the loan and/or the insurance policy may provide a cure period during which the borrower is given the opportunity to cure the non-compliance. Cure of the non-compliance may include simply resolving compliance with the terms of the loan, or, in examples, the borrower may be given the opportunity to arrange alternative debt, receive additional funding from internal stakeholders, receiving funding from equity and/or venture capital firms, sell the intellectual property and/or uncollateralized intellectual property to a competitor and/or other third parties, and/or license the intellectual property to third parties.

In examples where the non-compliance is not cured during the cure period, the lender may exercise an option to acquire the intellectual property that was collateralized against the loan. The loan documentation may provide one or more provisions that allows for transfer of the intellectual property without discretion of the borrower. The lender, now the legal owner of the intellectual property, may determine whether to liquidate the intellectual property and/or license the intellectual property to recoup all or a portion of the loaned amount, or the lender may make a claim on the insurance policy. In examples, the broker or another entity, may provide a valuation of the intellectual property, such as at the time of the non-compliance and/or at the time the intellectual property is transferred from the borrower to the lender. This valuation may be utilized by the lender to determine whether to attempt to liquidate the intellectual property and/or license the intellectual property, or make an insurance claim. In examples where the lender chooses to liquidate the intellectual property and/or license the intellectual property, the lender's right to make an insurance claim may be voided and the insurance policy may terminate. In examples where the lender chooses to make the insurance claim, the intellectual property may be transferred from the lender to the insurer. The insurance policy may include one or more provisions that may allow for the transfer of the intellectual property in such a circumstance. The valuation provided to the lender may be provided to the insurer and/or a separate valuation may be performed for the insurer.

It should be understood that whenever "digital property" is referred to herein, that term encompasses, in examples, one or more types of intellectual property, such as patents, copyrights, trade secrets, and/or trademarks. "Digital property" also encompasses data, materials, and/or other media that is confidential and/or proprietary to a given entity, whether or not those data, materials, and/or other media has been determined to be intellectual property and/or if intellectual-property rights have been granted and/or acquired.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example architecture 100 for digital property collateral protection. The architecture 100 may include, for example, one or more client-side devices, also described herein as electronic devices 102 and/or borrower devices 102. The architecture 100 also includes a broker system 104 that is remote from, but in communication with, the client-side electronic devices 102. The architecture 100 also includes a lender system 106 that is remote from, but in communication with, the client-side devices 102 and/or the broker system 104. The architecture 100 further includes an insurer system 108 that is remote from, but in communication with, the client-side devices 102, the broker system 104, and/or the lender system 106. Additionally, the borrower devices 102 may be associated with a borrower 110. The lender system 106 may be associated with a lender 112. The insurer system 108 may be associated with an insurer 114. Additionally, the broker system 104 may be associated with one or more individuals, such as a broking agent 116 (otherwise described herein as the broker 116) and/or a valuation agent 118.

The borrower devices 102 may include components such as, for example, one or more processors 120, one or more network interfaces 122, memory 124, one or more displays 126, and/or one or more input elements 128. The memory 126 may include components such as, for example, one or more applications 130. As shown in FIG. 1, the borrower devices 102 may include, for example, a computing device, a mobile phone, a tablet, a laptop, and/or one or more servers. It should be understood that the examples provided herein are illustrative and should not be considered the exclusive examples of the components of the borrower device 102. Additionally, one or more of the components of the borrower device 102 may be generally utilized to perform one or more of the actions, operations, and/or steps described herein as being performed by the borrower 110.

The broker system 104 may include components such as one or more processors 132, one or more network interfaces 134, and/or memory 136. The memory 136 may include one or more components such as one or more applications 138. It should be understood that the examples provided herein are illustrative and should not be considered the exclusive examples of the components of the broker system 104. Additionally, one or more of the components of the broker system 104 may be generally utilized to perform one or more of the actions, operations, and/or steps described herein as being performed by the broking agent 116 and/or the valuation agent 118.

Additionally, one or more of the components of the lender system 106 may be generally utilized to perform one or more of the actions, operations, and/or steps described herein as being performed by the lender 112. Additionally, one or more of the components of the insurer system 108 may be generally utilized to perform one or more of the actions, operations, and/or steps described herein as being performed by the insurer 114.

For example, the borrower 110 may approach the lender 112 for a loan. As part of the intake process for determining whether the borrower 110 will be awarded a loan, the borrower 110 and the lender 112 may determine that intellectual property assets of the borrower 110 are potential assets to be used as collateral for the loan. In these examples, the borrower 110 and/or the lender 112 may engage with a broker 116 to initiate the process of determining whether the borrower 110 and its intellectual property are candidates for a loan where the intellectual property is used as collateral.

The broker 116 and/or the lender 112 may send a discovery document to the borrower 110. The discovery document, also described herein as an intake document, may request information associated with the borrower 110 and the intellectual property associated with the borrower 110. For example, the discovery document may request information such as the borrower's name and industry, corporate structure, past ability to receive funding from a venture capital entity and/or a private equity source, corporate ownership structure and/or composition, identification of equity investors and their respective holdings, borrower valuation, pending offers of equity investment, revenue numbers, profit numbers, current contracts that are material to continued and/or initial revenue and/or profits, long-term company goals and/or growth routes, identification of the owner(s) of intellectual property associated with the borrower 110, assignment documents associated with the intellectual property, and specific information associated with the intellectual property. The information associated with the intellectual property may include a description of the intellectual property associated with the borrower 110, identifiers of the intellectual property and/or registration of the intellectual property, the countries in which the intellectual property is protected, a description of the borrower's intellectual property strategy, identification of the individuals and/or firms responsible for management and/or oversight of the borrower's intellectual property portfolio, estimated revenue and profit attributable to the intellectual property, identification and description of intellectual property licensing to third parties, historical exercise of intellectual property rights associated with products and/or services offered by the borrower, description of how revenues and/or profits from intellectual property are distributed by business segment and/or by country, previous valuations of the intellectual property, copies of licenses and/or agreements related to the intellectual property, identification of any known, unlicensed third-party use of the intellectual property, identification of any intellectual property that has been threatened, challenged, and/or subject to administrative and/or judicial actions, copies of standard employment contracts and identification of assignment provisions in those employment contracts, identification of key employees associated with the intellectual property and whether those employees have left the borrower 110, borrower's licensing of third-party intellectual property, procedures to avoid infringement of third-party intellectual property rights, whether the borrower 110 has insurance for theft of intellectual property and/or liability for infringement of third-party intellectual property, identification of potential purchasers of the intellectual property, and/or identification of key competitors. Additionally, in examples, the discovery document may request transactional information, such as the amount of the loan sought, an intended use for loan proceeds, identification of the lender, and/or alternative plans if the loan or collateral protection insurance is not available under the terms desired by the borrower. It should be understood that the example information described herein is used for illustrative purposes and is not by way of limitation. The information sought and/or received from the discovery document may be any information associated with the borrower 110 and/or the intellectual property.

The discovery document, as completed by the borrower 110 and/or lender 112, and/or information requested by the discovery document, may be sent to the broker 116. Additionally, in examples, the broker 116 may acquire additional information associated with the borrower 110, the lender 112, and/or the intellectual property such as from publicly-available information sources and/or sources associated with the borrower 110 and/or the lender 112. The broker 116 may utilize some or all of the information described herein for a pre-underwriting analysis. The pre-underwriting analysis may include, for example, a broking analysis and a qualitative valuation analysis. To perform one or more of these analyses, loan-origination data, also described herein as a loan-origination mix, may be identified, determined, and/or generated. The loan-origination data may include business-sector information, business-size information, and/or intellectual property content. The business-sector information may indicate, for example, one or more business sectors associated with the borrower 110. By way of example, the business sectors may include a technology sector, industrial sector, entertainment sector, medical sector, etc. In examples, a borrower 110 may be associated with one sector or with multiple sectors. The business-size information may indicate, for example, an amount of revenue, a number of employees, and/or an amount of profit associated with the borrower 110. The intellectual property content may include identifiers of the intellectual property assets associated with the borrower 110 as well as the type of intellectual property assets, such as patents, trade secrets, trademarks, copyrights, etc. This loan-origination data may be identified, determined, and/or generated utilizing the information from the discovery document and/or the publicly-available resources.

The loan-origination data may be utilized to identify, determine, and/or generate insurance-input data. The insurance-input data may include, for example, IP-criticality information, market-share information, and/or IP-prevalence information. The IP-criticality information may provide an indication of how critical intellectual property is to the borrower 110 and/or the borrower's business model. For example, a borrower 110 operating in the technology sector will be associated with a higher level of IP-criticality than, for example, a borrower 110 operating in the food sector. The market-share information may provide an indication of the relative size of the borrower 110 with respect to one or more competitors in the industry and/or industries. The IP-prevalence information may provide an indication of the general composition of the intellectual property associated with the borrower 110. For example, the IP-prevalence information may indicate that the borrower 110 is associated with 100 intellectual property assets, with 75 of those assets being patents, 10 of the assets being trademark registrations, 10 of the assets being copyright registrations, and 5 of the assets being trade secrets, which may or may not have been registered with a trade secret registry. This information may indicate that the prevalence of patents associated with the borrower 110 is relatively high with respect to the other intellectual property assets.

The loan-origination data and/or the insurance-input data may be utilized to perform the broking analysis described herein. For example, the broker 116 and/or the broker system 104 may utilize the loan-origination data and/or the insurance-input data to identify and/or determine an ownership structure of the borrower 110, previous debt and/or equity arrangements associated with the borrower 110, the type and/or number of intellectual property assets, an amount of revenue generated from the intellectual property assets, an amount of the loan sought, and/or a plan for loan funds. At this point, one or more reasons for declination of the loan and/or insurance policy may be identified and/or determined from the broking analysis. For example, the borrower 110 may be declined if one or more of the following exemplary determinations are made: the borrower 110 has no or little contracted revenue, there are no or inadequate equity finance alternatives, the borrower 110 does not own the intellectual property, the ownership structure of the borrower 110 indicates the presence of corporate and/or venture capital investors, the owners and/or principals of the borrower 110 do not have sufficient financial and/or business interest in the borrower 110, the intellectual property is unsubstantial, and/or the intellectual property is not aligned with the business. However, in other examples, the borrower 110 may pass or otherwise be cleared through the broking analysis.

For those borrowers 110 that clear the broking analysis, the qualitative valuation analysis may be performed utilizing the loan-origination data and/or the insurance-input data and/or the results from the broking analysis. For example, the valuation agent 118 may perform the qualitative valuation analysis, which may include identifying and/or determining information such as whether the intellectual property is owned by the borrower 110, whether there are any disputes involving the intellectual property, whether those disputes appear unfavorable, whether the intellectual property is proven to at least have a potential to generate profit and/or revenue, whether the intellectual property assets appear insubstantial relative to the business and/or loan, whether the intellectual property is aligned with the business, the status of the intellectual property assets, the degree of intellectual property asset commercialization, and/or the presence of licensing agreements associated with the intellectual property. Additionally, in some examples, one or more priorities of the broker system 104 may be applied to the qualitative valuation analysis. Those priorities may include the intellectual property portfolios having at least a threshold number of patents in a given country, patent coverage in other countries and particularly in countries associated with the business of the borrower 110, whether the intellectual property portfolio is growing and/or a rate of growth, licensing revenue thresholds, and/or sufficient secondary fields of use for the intellectual property.

The broking analysis and the qualitative valuation analysis may be utilized to make a pre-underwriting viability determination on whether the borrower 110 is a good candidate to receive the loan with the intellectual property as collateral and/or whether the insurance policy should be issued. For example, the process may include generating, based at least in part on a first quality of a borrower and a second quality of intellectual property associated with the borrower, a profile associated with the borrower. The profile may indicate support for a loan between the borrower and the lender to be insured by an insurance policy with the intellectual property as collateral for the loan. In examples, the pre-underwriting process may result in a score associated with the broking and qualitative valuation analyses and that score may be compared to one or more threshold scores to determine the viability of the borrower 110 for the loan and/or for the insurance policy to issue. In other examples, the viability determination may include the information generated by the broking and/or qualitative valuation analyses and a recommendation of the positives and negatives associated with such a deal.

For those potential deals that pass the pre-underwriting analysis, an underwriting analysis may be performed. The underwriting analysis may include one or more steps and/or operations, which may or may not be performed in the order described below. For example, the underwriting analysis may include field underwriting of the borrower 110, the loan, and/or the intellectual property. For example, this portion of the underwriting process may include resolution of questions raised in the discovery document that would be required to provide an initial indication of the value of the intellectual property, such as, for example, a current or contracted cash flow associated with the intellectual property. The underwriting analysis may also include providing an initial indication of the value of the intellectual property. The initial indication may be based at least in part on a qualitative assessment and/or a quantitative assessment of the intellectual property value. In this portion of the underwriting analysis, the value may include multiple values, such as a suggested value, a fair market assessment, a maximum value, a minimum value, etc., and the values may be determined using one or multiple methodologies. This information may be utilized to inform whether to proceed with the loan deal. During the qualitative intellectual property review, factors such as the degree of coverage, the amount of opportunity, and/or exposure risks may be evaluated and determined. Generally, a favorable qualitative intellectual property review will include good coverage by the intellectual property, expansive opportunity to grow and/or maintain coverage, and low exposure. Additionally, the valuation may be based at least in part on an intellectual property environment review, which may utilize worldwide and/or country-specific intellectual property data and/or financial data associated with the borrower 110. This information may be utilized to perform a global intellectual property assessment, the valuation, and/or a mapping of the intellectual property to the borrower's products and/or services. The qualitative intellectual property review, the quantitative intellectual property review, and/or the intellectual property environment review may be utilized to generate an intellectual property valuation report, which may indicate the value(s) of the intellectual property and/or factors associated with the valuation.

The underwriting analysis may also include engagement with the borrower 110, the lender 112, and/or the insurer 114, including the provision of applications to complete the loan and/or insurance policy. The broker 116 may collect the applications, as completed, supporting documentation, and may provide the valuation to one or more of the parties to the deal. The underwriting analysis may also include determining the terms of the loan and acceptance and/or review of a credit file associated with the borrower 110 to identify whether the loan and insurance policy includes provisions that allow for the transfer of intellectual property if certain conditions in the loan are met. The lien associated with the deal may also be secured at this point.

The underwriting analysis may also include providing an estimated price and desired limits with insurance carriers and/or engaging intellectual property holders as needed to support and validate intellectual property valuations. The underwriting analysis may also include monitoring intellectual property assets, and/or monitoring key employees, marketplaces, licensing deals, litigation, and/or intellectual property portfolio revenue performance during the underwriting period.

The underwriting analysis may also include identifying, determining, and/or generating a loan structure between the borrower 110 and the lender 112. The loan structure may indicate a value of the intellectual property, such as from the valuation described above. The loan structure may also include a value discount, which may represent a portion of the value of the intellectual property and may be based at least in part on one or more factors, such as the quality of the intellectual property, the quality of the borrower 110, and/or one or more constraints as set by the lender 112. A maximum loan amount may be identified and/or determined based at least in part on the difference between the value and the value discount. For example, the value of the intellectual property may be $28 million, and the value discount may be, for example, $8 million. In this example, the maximum loan amount may be $20 million, which is the difference between the $28 million value of the intellectual property and the $8 million value discount. Additionally, the loan structure may include a benchmark holdback amount, which may be a certain amount of the maximum loan that is held back by the lender 112 and is provided to the borrower 110 only if the borrower 110 meets or exceeds certain benchmarks, such revenue goals, asset growth, etc. Staying with the example utilized herein, the benchmark holdback amount may be, for example, $6 million. In this example, the initial loan amount, which may include accrued interest, may be $14 million, which is the difference between the $20 million maximum loan amount and the $6 million benchmark holdback amount. Additionally, an indication of the amount of interest associated with the loan may be provided. For example, the interest may be $2 million. In this example, the insurer 114 may issue an insurance policy with a maximum insurance payout of $12 million, which is the difference between the $14 million initial loan amount and the $2 million interest amount. As such, if all parties are in agreement, the loan may issue and the borrower 110 may be provided the $14 million initial loan amount (including accrued interest) by the lender 112, and the insurer 114 may issue the insurance policy to the lender 112 with the maximum insurance payout of $12 million.

In examples, the systems and/or individuals that are involved in the broking process may be separated and/or otherwise isolated from the systems and/or individuals that are involved in the qualitative valuation process. For example, the broking agent 116 may be separated from the valuation agent 118. In these examples, a communication barrier may be established between the broking agent 116 and the valuation agent 118 such that an independent evaluation at each step may be performed. The communication barrier may include at least one of a policy or a technology mechanism, such as access controls and/or firewalls, configured to reduce communication between the broking agent 116 and the valuation agent 118.

Based on the above, as illustrated in FIG. 1, the borrower 110 may provide information, such as in response to and/or as part of the intake document. The broker 116 may provide a recommendation and/or other material information associated with whether to issue the loan and/or the insurance policy. The lender 112 may provide the loan with the intellectual property as collateral, and the insurer 114 may provide the insurance policy covering non-compliance by the borrower 110.

Additionally, one or more processes may be performed subsequent to the issuing of the loan and/or the insurance policy. For example, the borrower 110, the lender 112, and/or the intellectual property may be monitored, such as by the broker 116, to determine if a material change has occurred that would impact the loan and/or the insurance policy. Such material changes may include the occurrence of one or more impairment triggers, such as a legal claim involving the borrower 110 and/or the intellectual property, a government action involving the borrower 110 and/or the intellectual property, a third-party action involving the borrower 110 and/or the intellectual property, a reputational event, a borrower-commenced legal action, and/or a bankruptcy event associated with the licensee. When such an event occurs, and/or when periodic monitoring reveals a decrease in the value of the intellectual property, a report and/or other notification may be sent to the borrower 110, the lender 112, and/or the insurer 114.

In addition to the impairment triggers described above, the borrower 110 may also fail to comply with terms of the loan in one or more respects. In these examples, the loan and/or the insurance policy may provide a cure period during which the borrower 110 is given the opportunity to cure the non-compliance. Cure of the non-compliance may include simply coming into compliance with the terms of the loan, or, in examples, the borrower 110 may be given the opportunity to arrange alternative debt, receive additional funding from internal stakeholders, receiving funding from equity and/or venture capital firms, sell the intellectual property and/or uncollateralized intellectual property to a competitor and/or other third parties, and/or license the intellectual property to third parties.

In examples where the non-compliance is not cured during the cure period, the lender 112 may exercise an option to acquire the intellectual property that was collateralized against the loan. The loan documentation may provide one or more provisions that allows for transfer of the intellectual property without discretion of the borrower 110. The lender 112, now the legal owner of the intellectual property, may determine whether to liquidate the intellectual property to recoup all or a portion of the loaned amount, or the lender 112 may make a claim on the insurance policy. In examples, the broker 116 or other entity, may provide a valuation of the intellectual property, such as at the time of the non-compliance and/or at the time the intellectual property is transferred from the borrower 110 to the lender 112. This valuation may be utilized by the lender 112 to determine whether to attempt to liquidate the intellectual property or make an insurance claim. In examples where the lender 112 chooses to liquidate the intellectual property and/or license the intellectual property, the lender's right to make an insurance claim may be voided and the insurance policy may terminate. In examples where the lender 112 chooses to make the insurance claim, the intellectual property may be transferred from the lender 112 to the insurer 114. The insurance policy may include one or more provisions that may allow for the transfer of the intellectual property in such a circumstance. The valuation provided to the lender 112 may be provided to the insurer 114 and/or a separate valuation may be performed for the insurer 114.

Additionally, in examples, one or more wizards may be enabled and may present options associated with the processes and actions described above, such as with respect to the discovery document, for example. The wizards as described herein may be a set of dialog boxes and/or input fields configured to be displayed, such as via the borrower device 102.

As shown in FIG. 1, several of the components of the broker system 104, the lender system 106, and/or the insurer system 108 and the associated functionality of those components as described herein may be performed by one or more of the other systems and/or by the borrower device 102. Additionally, or alternatively, some or all of the components and/or functionalities associated with the borrower device 102 may be performed, at least in part, by the broker system 104, the lender system 106, and/or the insurer system 108.

It should be noted that the exchange of data and/or information as described herein may be performed only in situations where a user has provided consent for the exchange of such information. For example, a user may be provided with the opportunity to opt in and/or opt out of data exchanges between devices and/or with the systems and/or for performance of the functionalities described herein. Additionally, when one of the devices is associated with a first user account and another of the devices is associated with a second user account, user consent may be obtained before performing some, any, or all of the operations and/or processes described herein.

It should be understood that anywhere in this disclosure where the term "trade secret" is used, it should be noted to include not only trade secrets, but any document and/or data and/or information including confidential information, know-how, and other information, and not necessarily documents, data, and/or information meeting a legal definition of the term "trade secret."

As used herein, a processor, such as processor(s) 120 and/or 132, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 120 and/or 132 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 120 and/or 132 may possess its own local memory, which also may store program components, program data, and/or one or more operating systems.

The memory 124 and/or 136 may include volatile and nonvolatile memory, removable and non-removable media implemented in any method or technology for storage of information, such as computer-readable instructions, data structures, program component, or other data. Such memory 124 and/or 136 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 124 and/or 136 may be implemented as computer-readable storage media ("CRSM"), which may be any available physical media accessible by the processor(s) 120 and/or 132 to execute instructions stored on the memory 124 and/or 136. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 124 and/or 136, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 122 and/or 134 may enable messages between the components and/or devices shown in architecture 100 and/or with one or more other remote systems, as well as other networked devices. Such network interface(s) 122 and/or 134 may include one or more network interface controllers (NICs) or other types of transceiver devices to send and receive messages over a network 140.

For instance, each of the network interface(s) 122 and/or 134 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 122 and/or 134 may include a wide area network (WAN) component to enable message over a wide area network.

Figure 2:
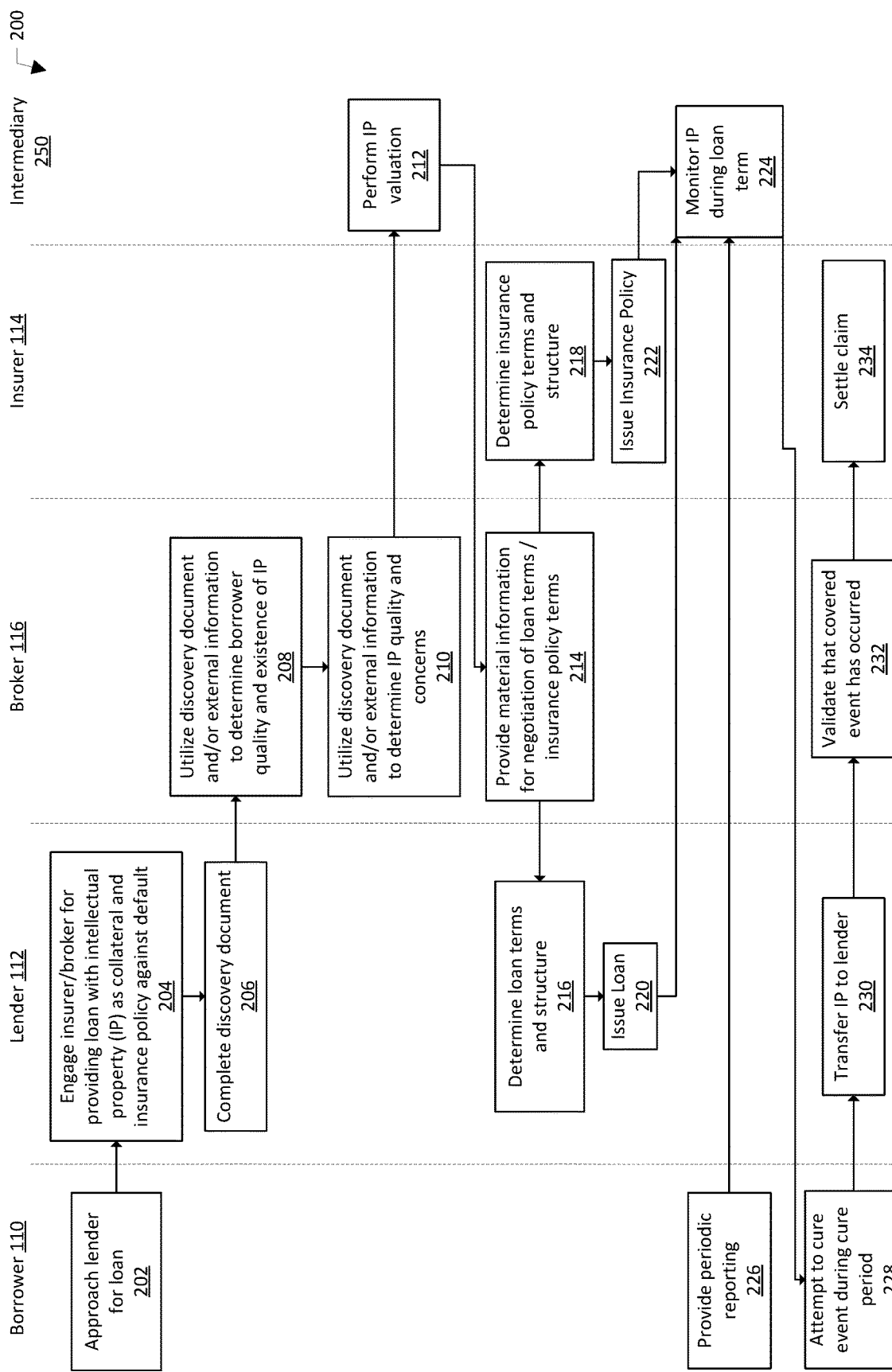
FIG. 2 illustrates a flow diagram of an example process for digital property collateral protection.

FIG. 2 illustrates processes for digital property collateral protection. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1 and 3-10, although the processes may be implemented in a wide variety of other environments, architectures and systems.

FIG. 2 illustrates a flow diagram of an example process 200 for digital property collateral protection. The order in which the operations or steps are described is not intended to be construed as a limitation, and any number of the described operations may be combined in any order and/or in parallel to implement process 200. The operations described with respect to the process 200 are described as being performed by one or more individuals and/or teams of individuals. However, it should be understood that some or all of these operations may be performed by some or all of components, devices, and/or systems described herein.

At block 202, the process 200 may include the borrower 110 approaching the lender 112 for a loan. For example, the borrower 110 may request a certain sum of money as a loan from the lender 112, and the lender 112 and/or the borrower 110 may request that intellectual property associated with the borrower 110 be collateralized against the loan, such as in situations where the intellectual property is central to the borrower's business and/or when the intellectual property is a valued asset of the borrower's business. In other examples, the borrower 110 may approach the broker 116 to initiate determining whether a loan may be obtained using intellectual property as collateral. In still other examples, the lender 112 may approach the broker 116 and/or the lender 112 may approach the borrower 110, such as in situations where broker 116 has provided the lender 112 with information about a given borrower that suggests the borrower 110 would be a good candidate for a loan arrangement such as discussed herein.

At block 204, the process 200 may include the lender 112 engaging the insurer 114 and/or the broker 116 for providing a loan with intellectual property of the borrower 110 as collateral and for an insurance policy protecting against non-compliance by the borrower 110. For example, the lender 112 may desire to provide the loan to the borrower 110, but may want to mitigate risk associated with such a loan. To do so, the lender 112 may desire to acquire an insurance policy against the borrower 110 failing to comply with the terms of the loan. The lender 112 may contact a particular insurer 114 to start the process of acquiring such an insurance policy and/or the lender 112 may contact the broker 116 to assist in acquiring the insurance policy and/or evaluating exposure associated with the loan.

At block 206, the process 200 may include the lender 112 completing a discovery document requesting information associated with the borrower 110 and/or the intellectual property. The broker 116 may send the discovery document to the lender 112. The lender 112 may then work with the borrower 110 to acquire the information requested by the discovery document. The discovery document, also described herein as an intake document, may request information associated with the borrower 110 and the intellectual property associated with the borrower 110. For example, the discovery document may request information such as the borrower's name and industry, corporate structure, past ability to receive funding from a venture capital entity and/or a private equity source, corporate ownership structure and/or composition, identification of equity investors and their respective holdings, borrower valuation, pending offers of equity investment, revenue numbers, profit numbers, current contracts that are material to continued and/or initial revenue and/or profits, long-term company goals and/or growth routes, identification of the owner(s) of intellectual property associated with the borrower 110, assignment documents associated with the intellectual property, and specific information associated with the intellectual property. The information associated with the intellectual property may include a description of the intellectual property associated with the borrower 110, identifiers of the intellectual property and/or registration of the intellectual property, the countries in which the intellectual property is protected, a description of the borrower's intellectual property strategy, identification of the individuals and/or firms responsible for management and/or oversight of the borrower's intellectual property portfolio, estimated revenue and profit attributable to the intellectual property, identification and description of intellectual property licensing to third parties, historical exercise of intellectual property rights associated with products and/or services offered by the borrower, description of how revenues and/or profits from intellectual property are distributed by business segment and/or by country, previous valuations of the intellectual property, copies of licenses and/or agreements related to the intellectual property, identification of any known, unlicensed third-party use of the intellectual property, identification of any intellectual property that has been threatened, challenged, and/or subject to administrative and/or judicial actions, copies of standard employment contracts and identification of assignment provisions in those employment contracts, identification of key employees associated with the intellectual property and whether those employees have left the borrower 110, borrower's licensing of third-party intellectual property, procedures to avoid infringement of third-party intellectual property rights, whether the borrower 110 has insurance for theft of intellectual property and/or liability for infringement of third-party intellectual property, identification of potential purchasers of the intellectual property, and/or identification of key competitors. Additionally, in examples, the discovery document may request transactional information, such as the amount of the loan sought, an intended use for loan proceeds, identification of the lender, and/or alternative plans if the loan or collateral protection insurance is not available under the terms desired by the borrower. It should be understood that the example information described herein is used for illustrative purposes and is not by way of limitation. The information sought and/or received from the discovery document may be any information associated with the borrower 110 and/or the intellectual property.

The discovery document, as completed by the borrower 110 and/or lender 112, and/or information requested by the discovery document, may be sent to the broker 116. Additionally, in examples, the broker 116 may acquire additional information associated with the borrower 110, the lender 112, and/or the intellectual property such as from publicly-available information sources and/or sources associated with the borrower 110 and/or the lender 112.

At block 208, the process 200 may include the broker 116 utilizing the discovery document and/or external information to determine borrower quality and existence of intellectual property associated with the borrower 110, which may be described as a pre-underwriting analysis. The pre-underwriting analysis may include, for example, a broking analysis and a qualitative valuation analysis. To perform one or more of these analyses, loan-origination data, also described herein as a loan-origination mix, may be identified, determined, and/or generated. The loan-origination data may include business-sector information, business-size information, and/or intellectual property content. The business-sector information may indicate, for example, one or more business sectors associated with the borrower 110. By way of example, the business sectors may include a technology sector, industrial sector, entertainment sector, medical sector, etc. In examples, a borrower 110 may be associated with one sector or with multiple sectors. The business-size information may indicate, for example, an amount of revenue, a number of employees, and/or an amount of profit associated with the borrower 110. The intellectual property content may include identifiers of the intellectual property assets associated with the borrower 110 as well as the type of intellectual property assets, such as patents, trade secrets, trademarks, copyrights, etc. This loan-origination data may be identified, determined, and/or generated utilizing the information from the discovery document and/or the publicly-available resources.

The loan-origination data may be utilized to identify, determine, and/or generate insurance-input data. The insurance-input data may include, for example, IP-criticality information, market-share information, and/or IP-prevalence information. The IP-criticality information may provide an indication of how critical intellectual property is to the borrower 110 and/or the borrower's business model. For example, a borrower 110 operating in the technology sector will be associated with a higher level of IP-criticality than, for example, a borrower 110 operating in the food sector. The market-share information may provide an indication of the relative size of the borrower 110 with respect to one or more competitors in the industry and/or industries. The IP-prevalence information may provide an indication of the general composition of the intellectual property associated with the borrower 110. For example, the IP-prevalence information may indicate that the borrower 110 is associated with 100 intellectual property assets, with 75 of those assets being patents, 10 of the assets being trademark registrations, 10 of the assets being copyright registrations, and 5 of the assets being trade secrets, which may or may not have been registered with a trade secret registry. This information may indicate that the prevalence of patents associated with the borrower 110 is relatively high with respect to the other intellectual property assets.

The loan-origination data and/or the insurance-input data may be utilized to perform the broking analysis described herein. For example, the broker 116 and/or the broker system 104 may utilize the loan-origination data and/or the insurance-input data to identify and/or determine an ownership structure of the borrower 110, previous debt and/or equity arrangements associated with the borrower 110, the type and/or number of intellectual property assets, an amount of revenue generated from the intellectual property assets, an amount of the loan sought, and/or a plan for loan funds. At this point, one or more reasons for declination of the loan and/or insurance policy may be identified and/or determined from the broking analysis. For example, the borrower 110 may be declined if one or more of the following exemplary determinations are made: the borrower 110 has no or little contracted revenue, there are no or inadequate equity finance alternatives, the borrower 110 does not own the intellectual property, the ownership structure of the borrower 110 indicates the presence of corporate and/or venture capital investors, the owners and/or principals of the borrower 110 do not have sufficient financial and/or business interest in the borrower 110, the intellectual property is unsubstantial, and/or the intellectual property is not aligned with the business. However, in other examples, the borrower 110 may pass or otherwise be cleared through the broking analysis.

At block 210, the process 200 may include the broker 116 utilizing the discovery document and/or external information to determine intellectual property quality and concerns, if any, regarding the intellectual property. For example, for those borrowers 110 that clear the broking analysis described with respect to block 208, the qualitative valuation analysis may be performed utilizing the loan-origination data and/or the insurance-input data and/or the results from the broking analysis. For example, a valuation agent may perform the qualitative valuation analysis, which may include identifying and/or determining information such as whether the intellectual property is owned by the borrower 110, whether there are any disputes involving the intellectual property, whether those disputes appear unfavorable, whether the intellectual property is proven to at least have a potential to generate profit and/or revenue, whether the intellectual property assets appear insubstantial relative to the business and/or loan, whether the intellectual property is aligned with the business, the status of the intellectual property assets, the degree of intellectual property asset commercialization, and/or the presence of licensing agreements associated with the intellectual property. Additionally, in some examples, one or more priorities of the broker system 104 may be applied to the qualitative valuation analysis. Those priorities may include the intellectual property portfolios having at least a threshold number of patents in a given country, patent coverage in other countries and particularly in countries associated with the business of the borrower 110, whether the intellectual property portfolio is growing and/or a rate of growth, licensing revenue thresholds, and/or sufficient secondary fields of use for the intellectual property.

The broking analysis and the qualitative valuation analysis may be utilized to make a pre-underwriting viability determination on whether the borrower 110 is a good candidate to receive the loan with the intellectual property as collateral and/or whether the insurance policy should be issued. In examples, the pre-underwriting process may result in a score associated with the broking and qualitative valuation analyses and that score may be compared to one or more threshold scores to determine the viability of the borrower 110 for the loan and/or for the insurance policy to issue. In other examples, the viability determination may include the information generated by the broking and/or qualitative valuation analyses and a recommendation of the positives and negatives associated with such a deal.

At block 212, the process 200 may include an intermediary 250 performing an intellectual property valuation. For example, for those potential deals that pass the pre-underwriting analysis, an underwriting analysis may be performed. The underwriting analysis may include one or more steps and/or operations in addition to the valuation of the intellectual property, which may or may not be performed in the order described below. For example, the underwriting analysis may include field underwriting of the borrower 110, the loan, and/or the intellectual property. For example, this portion of the underwriting process may include resolution of questions raised in the discovery document that would be required to provide an initial indication of the value of the intellectual property, such as, for example, a current or contracted cash flow associated with the intellectual property. The underwriting analysis may also include providing an initial indication of the value of the intellectual property. The initial indication may be based at least in part on a qualitative assessment and/or a quantitative assessment of the intellectual property value. In this portion of the underwriting analysis, the value may include multiple values, such as a suggested value, a fair market assessment, a maximum value, a minimum value, etc., and the values may be determined using one or multiple methodologies. This information may be utilized to inform whether to proceed with the loan deal. During the qualitative intellectual property review, factors such as the degree of coverage, the amount of opportunity, and/or exposure risks may be evaluated and determined. Generally, a favorable qualitative intellectual property review will include good coverage by the intellectual property, expansive opportunity to grow and/or maintain coverage, and low exposure. Additionally, the valuation may be based at least in part on an intellectual property environment review, which may utilize worldwide and/or country-specific intellectual property data and/or financial data associated with the borrower 110. This information may be utilized to perform a global intellectual property assessment, the valuation, and/or a mapping of the intellectual property to the borrower's products and/or services. The qualitative intellectual property review, the quantitative intellectual property review, and/or the intellectual property environment review may be utilized to generate an intellectual property valuation report, which may indicate the value(s) of the intellectual property and/or factors associated with the valuation. It should be understood that in example the intermediary 250 may be associated with the broker 116 and/or may be separate from the broker 116 and may be hired or otherwise engaged by the broker 116, the lender 112, and/or the insurer 114 to perform the valuation described herein. In any situation herein where the broker 116 is described as performing the valuation, the intermediary may additionally, or alternatively, perform the valuation.

At block 214, the process 200 may include the broker 116 providing material information associated with the quality determinations and/or the valuation for negotiation of loan terms and/or insurance policy terms. For example, the process may include generating, based at least in part on a first quality of a borrower and a second quality of intellectual property associated with the borrower, a profile associated with the borrower. The profile may indicate support for a loan between the borrower and the lender to be insured by an insurance policy with the intellectual property as collateral for the loan. The material information, which may include the profile, may be provided to the lender 112 and/or the insurer 114. For example, the material information may be utilized to identify, determine, and/or generate a loan structure between the borrower 110 and the lender 112.

At block 216, the process 200 may include the lender 112 determining the loan terms and loan structure, such as based at least in part on the material information from the broker 116. For example, the loan structure may indicate a value of the intellectual property, such as from the valuation described above. The loan structure may also include a value discount, which may represent a portion of the value of the intellectual property and may be based at least in part on one or more factors, such as the quality of the intellectual property, the quality of the borrower 110, and/or one or more constraints as set by the lender 112. A maximum loan amount may be identified and/or determined based at least in part on the difference between the value and the value discount. For example, the value of the intellectual property may be $28 million, and the value discount may be, for example, $8 million. In this example, the maximum loan amount may be $20 million, which is the difference between the $28 million value of the intellectual property and the $8 million value discount. Additionally, the loan structure may include a benchmark holdback amount, which may be a certain amount of the maximum loan that is held back by the lender 112 and is provided to the borrower 110 only if the borrower 110 meets or exceeds certain benchmarks, such revenue goals, asset growth, etc. Staying with the example utilized herein, the benchmark holdback amount may be, for example, $6 million. In this example, the initial loan amount, which may include accrued interest, may be $14 million, which is the difference between the $20 million maximum loan amount and the $6 million benchmark holdback amount. Additionally, an indication of the amount of interest associated with the loan may be provided. For example, the interest may be $2 million. In this example, the insurer 114 may issue an insurance policy with a maximum insurance payout of $12 million, which is the difference between the $14 million initial loan amount and the $2 million interest amount. As such, if all parties are in agreement, the loan may issue and the borrower 110 may be provided the $14 million initial loan amount (including accrued interest) by the lender 112, and the insurer 114 may issue the insurance policy to the lender 112 with the maximum insurance payout of $12 million.

Currently, or sequentially, at block 218, the process 200 may include the insurer 114 determining insurance policy terms and/or insurance policy structure. The insurance policy structure may include a determination of the maximum insurance payout and/or exclusions associated with the insurance policy.

At block 220, the process 200 may include the lender 112 may issue the loan to the borrower 110, particularly when the lender 112 has received notification that the insurance policy will issue from the insurer 114. At block 222, the process 200 may include the insurer 114 issuing the insurance policy.

At block 224, after issuance of the loan and/or the insurance policy, the intermediary 250 and/or the broker 116 may monitor the intellectual property and/or the borrower 110 for one or more impairment events or valuation changes. For example, the borrower 110, the lender 112, and/or the intellectual property may be monitored, such as by the intermediary 250, to determine if a material change has occurred that would impact the loan and/or the insurance policy. Such material changes may include the occurrence of one or more impairment triggers, such as a legal claim involving the borrower 110 and/or the intellectual property, a government action involving the borrower 110 and/or the intellectual property, a third-party action involving the borrower 110 and/or the intellectual property, a reputational event, a borrower-commenced legal action, and/or a bankruptcy event associated with the licensee. When such an event occurs, and/or when periodic monitoring reveals a decrease in the value of the intellectual property, a report and/or other notification may be sent to the borrower 110, the lender 112, and/or the insurer 114.

At block 226, and in response to requests from the broker 116 and/or as a covenant described in the loan with the lender 112, the borrower 110 may provide periodic reporting to the broker 116 to assist with the monitoring described with respect to block 224.

At this point, the borrower 110 may commence paying back the loan pursuant to the terms of the loan. In examples, the borrower 110 may completely pay back the loan, and in these examples the loan may terminate, and the insurance policy may also terminate. In other examples where the borrower 110 fails to comply with the terms of the loan, at block 228, the process 200 may include the borrower 110 attempting to cure the non-compliance during a cure period. Cure of the non-compliance may include simply coming into compliance with the terms of the loan, or, in examples, the borrower 110 may be given the opportunity to arrange alternative debt, receive additional funding from internal stakeholders, receiving funding from equity and/or venture capital firms, sell the intellectual property and/or uncollateralized intellectual property to a competitor and/or other third parties, and/or license the intellectual property to third parties.

If the borrower does not cure the non-compliance during the cure period, at block 230, the collateralized intellectual property may be transferred to the lender 112. For example, where the non-compliance is not cured during the cure period, the lender 112 may exercise an option to acquire the intellectual property that was collateralized against the loan. The loan documentation may provide one or more provisions that allows for transfer of the intellectual property without discretion of the borrower 110. The lender 112, now the legal owner of the intellectual property, may determine whether to liquidate the intellectual property to recoup all or a portion of the loaned amount, or the lender 112 may make a claim on the insurance policy. In examples, the broker 116 or other entity, may provide a valuation of the intellectual property, such as at the time of the non-compliance and/or at the time the intellectual property is transferred from the borrower 110 to the lender 112. This valuation may be utilized by the lender 112 to determine whether to attempt to liquidate the intellectual property or make an insurance claim.

If the lender makes a claim pursuant to the insurance policy, then at block 232, the process 200 may include the broker 116 validating that the covered event has occurred. For example, research on the circumstances surrounding the potential covered event may be performed and an analysis of those circumstances may be utilized to determine whether the covered event at issue has occurred. At block 234, the process 200 may include the insurer 114 settling the insurance claim. For example, settling the insurance claim may include transferring the collateralized intellectual property to the insurer 114. For example, where the lender 112 chooses to liquidate the intellectual property and/or license the intellectual property, the lender's right to make an insurance claim may be voided and the insurance policy may terminate. In examples where the lender 112 chooses to make the insurance claim, the intellectual property may be transferred from the lender 112 to the insurer 114. The insurance policy may include one or more provisions that may allow for the transfer of the intellectual property in such a circumstance. The valuation provided to the lender 112 may be provided to the insurer 114 and/or a separate valuation may be performed for the insurer 114. In still other examples, the insurer 114 and the lender 112 may work together prior to the collateralized intellectual property transferring to the insurer 114 to liquid the intellectual property. In instances where the liquidated intellectual property has a value and/or proceed that is less than the claimed amount, the insurer 114, pursuant to the terms of a given insurance policy, may provide a payout that covers the difference between the payout limit of the policy and the proceed value.

Figure 3:
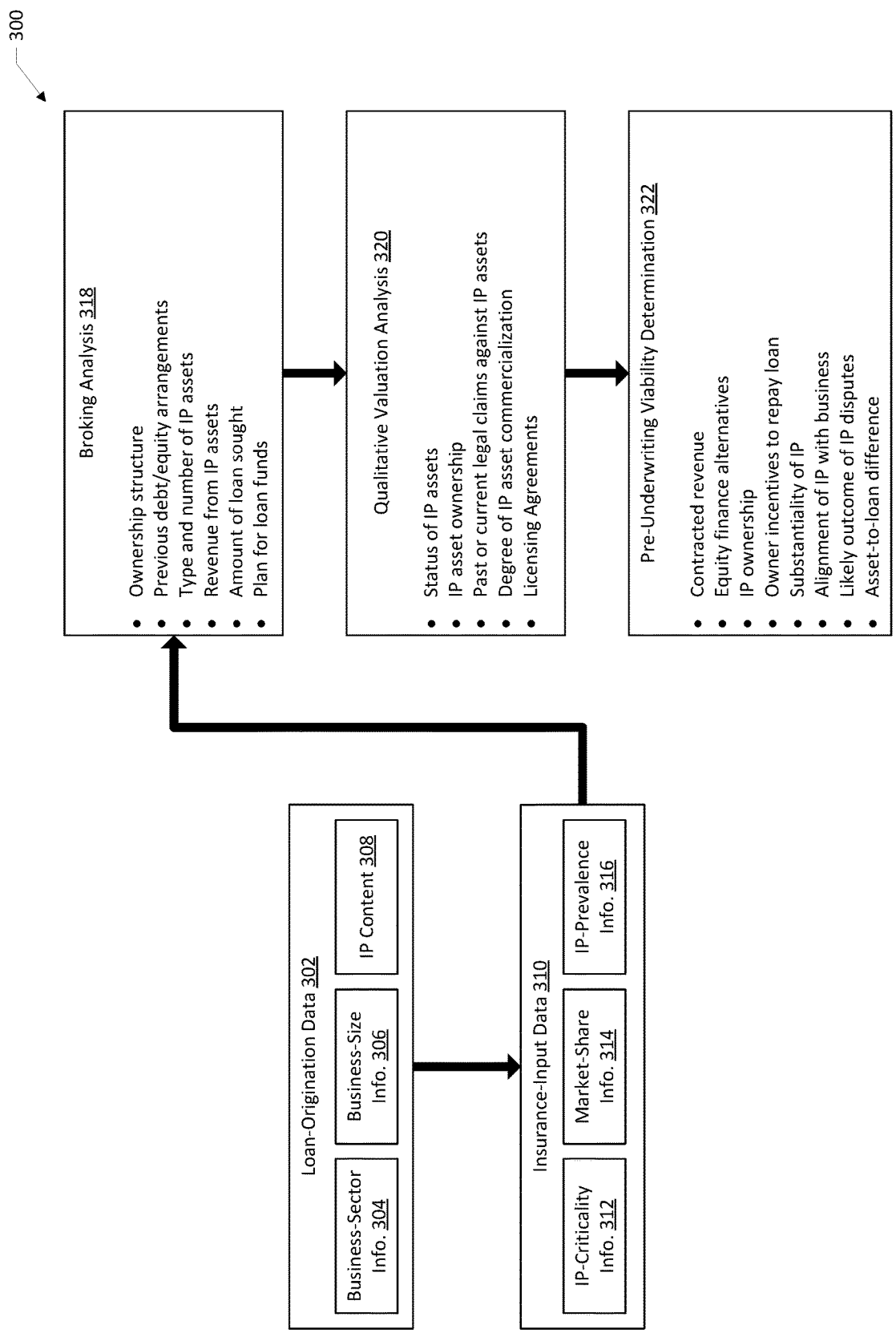
FIG. 3 illustrates a conceptual diagram of information and processes for pre-underwriting associated with digital property collateral protection.

FIG. 3 illustrates a conceptual diagram of information and processes for pre-underwriting analysis 300 associated with digital property collateral protection.

For example, the pre-underwriting analysis 300 may include, for example, a broking analysis 318 and a qualitative valuation analysis 320. To perform one or more of these analyses, loan-origination data 302, also described herein as a loan-origination mix, may be identified, determined, and/or generated. The loan-origination data 302 may include business-sector information 304, business-size information 306, and/or intellectual property content 308. The business-sector information 304 may indicate, for example, one or more business sectors associated with the borrower. By way of example, the business sectors may include a technology sector, industrial sector, entertainment sector, medical sector, etc. In examples, a borrower may be associated with one sector or with multiple sectors. The business-size information 306 may indicate, for example, an amount of revenue, a number of employees, and/or an amount of profit associated with the borrower. The intellectual property content 308 may include identifiers of the intellectual property assets associated with the borrower as well as the type of intellectual property assets, such as patents, trade secrets, trademarks, copyrights, etc. This loan-origination data 302 may be identified, determined, and/or generated utilizing the information from a discovery document completed by the borrower and/or lender and/or publicly-available resources.

The loan-origination data 302 may be utilized to identify, determine, and/or generate insurance-input data 310. The insurance-input data 310 may include, for example, IP-criticality information 312, market-share information 314, and/or IP-prevalence information 316. The IP-criticality information 312 may provide an indication of how critical intellectual property is to the borrower and/or the borrower's business model. For example, a borrower operating in the technology sector will be associated with a higher level of IP-criticality than, for example, a borrower operating in the food sector. The market-share information 314 may provide an indication of the relative size of the borrower with respect to one or more competitors in the industry and/or industries. The IP-prevalence information 316 may provide an indication of the general composition of the intellectual property associated with the borrower. For example, the IP-prevalence information 316 may indicate that the borrower is associated with 100 intellectual property assets, with 75 of those assets being patents, 10 of the assets being trademark registrations, 10 of the assets being copyright registrations, and 5 of the assets being trade secrets, which may or may not have been registered with a trade secret registry. This information 316 may indicate that the prevalence of patents associated with the borrower is relatively high with respect to the other intellectual property assets.

The loan-origination data 302 and/or the insurance-input data 310 may be utilized to perform the broking analysis 318. For example, the broker and/or a system associated with the broker may utilize the loan-origination data 302 and/or the insurance-input data 310 to identify and/or determine an ownership structure of the borrower, previous debt and/or equity arrangements associated with the borrower, the type and/or number of intellectual property assets, an amount of revenue generated from the intellectual property assets, an amount of the loan sought, and/or a plan for loan funds. At this point, one or more reasons for declination of the loan and/or insurance policy may be identified and/or determined from the broking analysis. For example, the borrower may be declined if one or more of the following exemplary determinations are made: the borrower has no or little contracted revenue, there are no or inadequate equity finance alternatives, the borrower does not own the intellectual property, the ownership structure of the borrower indicates the presence of corporate and/or venture capital investors, the owners and/or principals of the borrower do not have sufficient financial and/or business interest in the borrower, the intellectual property is unsubstantial, and/or the intellectual property is not aligned with the business.

However, in other examples, the borrower may pass or otherwise be cleared through the broking analysis.

For those borrowers that clear the broking analysis 318, the qualitative valuation analysis 320 may be performed utilizing the loan-origination data 302 and/or the insurance-input data 310 and/or the results from the broking analysis 318. For example, the qualitative valuation analysis 318 may include identifying and/or determining information such as whether the intellectual property is owned by the borrower, whether there are any disputes involving the intellectual property, whether those disputes appear unfavorable, whether the intellectual property is proven to at least have a potential to generate profit and/or revenue, whether the intellectual property assets appear insubstantial relative to the business and/or loan, whether the intellectual property is aligned with the business, the status of the intellectual property assets, the degree of intellectual property asset commercialization, and/or the presence of licensing agreements associated with the intellectual property. Additionally, in some examples, one or more priorities of the broker may be applied to the qualitative valuation analysis. Those priorities may include the intellectual property portfolios having at least a threshold number of patents in a given country, patent coverage in other countries and particularly in countries associated with the business of the borrower, whether the intellectual property portfolio is growing and/or a rate of growth, licensing revenue thresholds, and/or sufficient secondary fields of use for the intellectual property.

The broking analysis 318 and the qualitative valuation analysis 320 may be utilized to make a pre-underwriting viability determination 322 on whether the borrower is a good candidate to receive the loan with the intellectual property as collateral and/or whether the insurance policy should be issued. In examples, the pre-underwriting process 300 may result in a score associated with the broking analysis 318 and the qualitative valuation analysis 320 and that score may be compared to one or more threshold scores to determine the viability of the borrower for the loan and/or for the insurance policy to issue. In other examples, the viability determination 322 may include the information generated by the broking and/or qualitative valuation analyses and a recommendation of the positives and negatives associated with such a deal.

Figure 4:
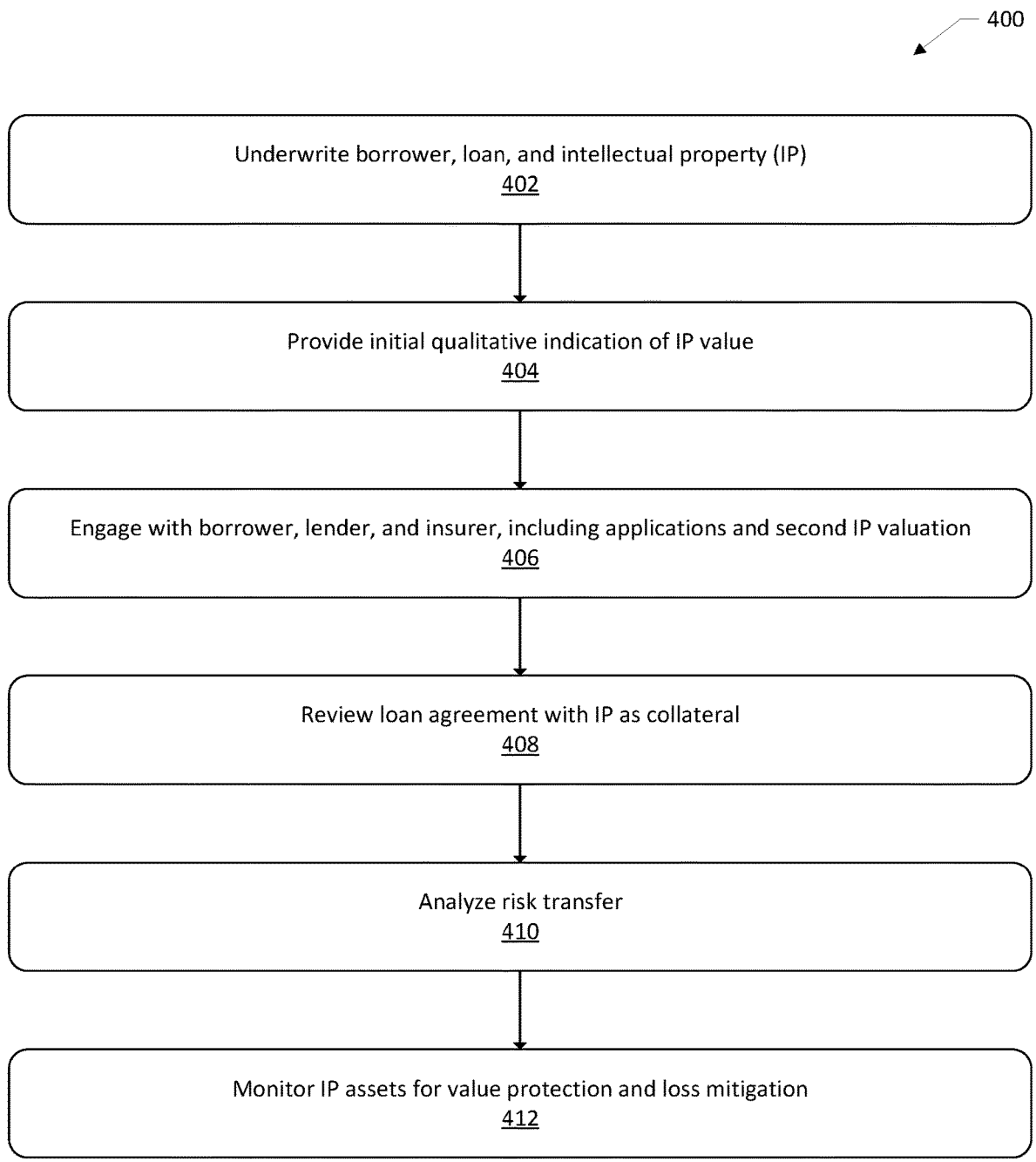
FIG. 4 illustrates a flow diagram of an example process of underwriting associated with digital property collateral protection.

FIG. 4 illustrates processes for digital property collateral protection. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-3 and 5-10, although the processes may be implemented in a wide variety of other environments, architectures and systems.

FIG. 4 illustrates a flow diagram of an example process 400 of underwriting associated with digital property collateral protection. The order in which the operations or steps are described is not intended to be construed as a limitation, and any number of the described operations may be combined in any order and/or in parallel to implement process 400. The operations described with respect to the process 400 are described as being performed by one or more individuals and/or teams of individuals. However, it should be understood that some or all of these operations may be performed by some or all of components, devices, and/or systems described herein.

At block 402, the process 400 may include field underwriting of a borrower, a loan, and/or intellectual property. For example, this portion of the underwriting process may include resolution of questions raised in the discovery document that would be required to provide an initial indication of the value of the intellectual property, such as, for example, a current or contracted cash flow associated with the intellectual property.

At block 404, the process 400 may include identifying, determining, and/or generating an initial indication of intellectual property value. The initial indication may be based at least in part on a qualitative assessment and/or a quantitative assessment of the intellectual property value. In this portion of the underwriting analysis, the value may include multiple values, such as a suggested value, a fair market assessment, a maximum value, a minimum value, etc., and the values may be determined using one or multiple methodologies. This information may be utilized to inform whether to proceed with the loan deal. During the qualitative intellectual property review, factors such as the degree of coverage, the amount of opportunity, and/or exposure risks may be evaluated and determined. Generally, a favorable qualitative intellectual property review will include good coverage by the intellectual property, expansive opportunity to grow and/or maintain coverage, and low exposure. Additionally, the valuation may be based at least in part on an intellectual property environment review, which may utilize worldwide and/or country-specific intellectual property data and/or financial data associated with the borrower. This information may be utilized to perform a global intellectual property assessment, the valuation, and/or a mapping of the intellectual property to the borrower's products and/or services. The qualitative intellectual property review, the quantitative intellectual property review, and/or the intellectual property environment review may be utilized to generate an intellectual property valuation report, which may indicate the value(s) of the intellectual property and/or factors associated with the valuation. The indication may include, for example, a "yes" or "no" that the assessment of intellectual property value is robust enough to move forward with determining if the deal should proceed.

At block 406, the process 400 may include engaging with a borrower, a lender, and/or an insurer, including the sending of applications and a second intellectual property valuation. For example, the broker may collect the applications, as completed, supporting documentation, and may provide the valuation to one or more of the parties to the deal. The second intellectual property valuation may be based at least in part on the initial valuation and/or the information received from the borrower, the lender, and/or the insurer, such as from the applications.

At block 408, the process 400 may include reviewing a loan agreement between the borrower and the lender, where the intellectual property is held as collateral against the failure to comply with the terms of the loan. This portion of the underwriting analysis may also include determining the terms of the loan, in conjunction with the lender, and acceptance and/or review of a credit file associated with the borrower to identify whether the loan and insurance policy includes provisions that allow for the transfer of intellectual property if certain conditions in the loan are met. The lien associated with the deal may also be secured at this point. This portion of the underwriting analysis may also include providing an estimated price and desired limits with insurance carriers and/or engaging intellectual property holders as needed to support and validate intellectual property valuations.

At block 410, the process 400 may include performing an analysis of risk transfer provisions and/or events associated with transfer of the intellectual property from the borrower to the lender and/or from the lender to the insurer. This portion of the underwriting analysis may include a review of the loan and/or insurance policy documents to ensure risk transfer provisions are present and/or the ensure the risk transfer provisions include impairment triggers. In addition, in examples, the process 400 may include allowing for one or more of the parties, such as the borrower, lender, and/or insurance to purchase or otherwise acquire the valuation assessment of the intellectual property even in instances where the loan and/or insurance policy does not issue.

At block 412, the process 400 may include monitoring the intellectual property assets for value protection and loss mitigation. For example, this portion of the underwriting analysis may include monitoring intellectual property assets (and/or monitoring key employees, marketplaces, licensing deals, litigation, and/or intellectual property portfolio revenue performance during the underwriting period).

The underwriting analysis may also include identifying, determining, and/or generating a loan structure between the borrower and the lender. The loan structure may indicate a value of the intellectual property, such as from the valuation described above. The loan structure may also include a value discount, which may represent a portion of the value of the intellectual property and may be based at least in part on one or more factors, such as the quality of the intellectual property, the quality of the borrower, and/or one or more constraints as set by the lender. A maximum loan amount may be identified and/or determined based at least in part on the difference between the value and the value discount. For example, the value of the intellectual property may be $28 million, and the value discount may be, for example, $8 million. In this example, the maximum loan amount may be $20 million, which is the difference between the $28 million value of the intellectual property and the $8 million value discount. Additionally, the loan structure may include a benchmark holdback amount, which may be a certain amount of the maximum loan that is held back by the lender and is provided to the borrower only if the borrower meets or exceeds certain benchmarks, such revenue goals, asset growth, etc. Staying with the example utilized herein, the benchmark holdback amount may be, for example, $6 million. In this example, the initial loan amount, which may include accrued interest, may be $14 million, which is the difference between the $20 million maximum loan amount and the $6 million benchmark holdback amount. Additionally, an indication of the amount of interest associated with the loan may be provided. For example, the interest may be $2 million. In this example, the insurer may issue an insurance policy with a maximum insurance payout of $12 million, which is the difference between the $14 million initial loan amount and the $2 million interest amount. As such, if all parties are in agreement, the loan may issue, and the borrower may be provided the $14 million initial loan amount (including accrued interest) by the lender, and the insurer may issue the insurance policy to the lender with the maximum insurance payout of $12 million.

Figure 5:
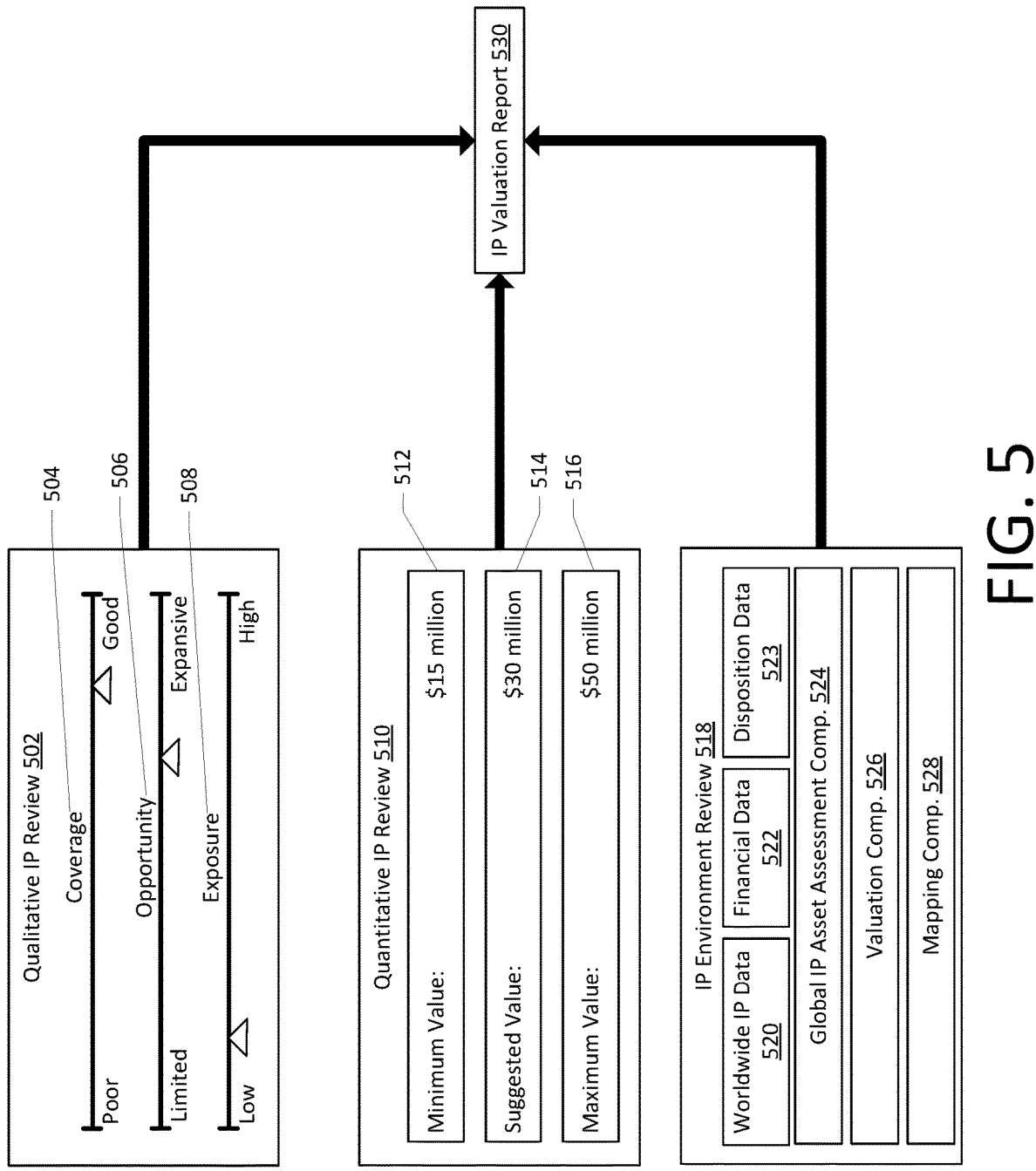
FIG. 5 illustrates a conceptual diagram of information and processes for valuation of intellectual property associated with digital property collateral protection.

FIG. 5 illustrates a conceptual diagram of information and processes for valuation of intellectual property associated with digital property collateral protection. This valuation, for example, may be performed as part of an underwriting process. For example, the valuation may include a qualitative intellectual property review 502, a quantitative intellectual property review 510, and/or an intellectual property environment review 518.

For example, during the qualitative intellectual property review 502, factors such as the degree of coverage 504, the amount of opportunity 506, and/or exposure risks 508 may be evaluated and determined. Generally, a favorable qualitative intellectual property review 502 will result in good coverage 504 by the intellectual property, expansive opportunity 506 to grow and/or maintain coverage, and low exposure 508. An analysis of the coverage 504 may include an analysis of, for example, the scope of the claims in patents of the intellectual property assets and/or the number of claims and/or patents. The coverage 504 may also include an analysis of, for example, a number of trade secrets maintained by the borrower and/or whether the trade secret have been registered with a trade secret registry. An analysis of the opportunity 506 may include an analysis of, for example, an amount of "white space" or otherwise potential technological availability that has not been patented or otherwise acquired/owned by competitors. An analysis of the exposure 508 may include an analysis of one or more concerns associated with the intellectual property, such as material coverage gaps, the existence of technology that may not be patent eligible and/or may not pass judicial scrutiny, logistical and/or technical faults in paperwork associated with the patent, and/or inventorship issues.

During the quantitative intellectual property review 510, multiple values may be determined, such as a minimum value 512, a suggested value 514, a maximum value 516, and/or one or more other values such as a fair market assessment, etc. The minimum value 512 may represent a value of the intellectual property if the occurrence of certain events, such as partial invalidation and/or negative corporate events, were to occur. The minimum value 512 may represent the lowest reasonable value of the intellectual property. The maximum value 516 may represent a value of the intellectual property under favorable conditions and/or events, such as increasing revenue projections, increased intellectual property portfolio quality and/or quantity, etc. The suggested value 514 may represent a value that may be generally higher than the minimum value 512 and lower than the maximum value 516. The suggested value 514 may be the value of the intellectual property as estimated when the assets are to be sold, such as to a competitor, without a sale of the borrower's business and/or goodwill associated therewith. The quantitative intellectual property review 510 may utilize the information determined during the qualitative intellectual property review 502 to generate the minimum value 512, the suggested value 514, and/or the maximum value 516.

It should be understood that while specific values and/or indications of qualitative factors are provided and illustrated in FIG. 5, those values and/or indications are provided by way of example only and not by way of limitation. The values may differ for a given borrower and/or intellectual property portfolio, and the qualitative indications may differ as well based on the borrower and/or the intellectual property portfolio.

Additionally, the valuation may be based at least in part on the intellectual property environment review 518, which may utilize worldwide and/or country-specific intellectual property data 520 and/or financial data 522 associated with the borrower. This information may be utilized to perform the intellectual property environment review 518. For example, a global intellectual property asset assessment component 524 may be utilized to perform a global intellectual property assessment based at least in part on the worldwide intellectual property data 520. The global intellectual property asset assessment component 524 may generate data indicating a number of assets in given countries, the substance of the assets in those countries, and/or data indicating relationships between assets as between countries. A valuation component 526 may be utilized to determine an estimated value of the assets based at least in part on the results from the global intellectual property asset assessment component 524 and/or the financial data 522. Additionally, a mapping component 528 may be utilized to generate a mapping and/or association between intellectual property assets and products and/or services provided by the borrower. The mapping component 528 may generate data indicating a degree of overlap between the coverage of the assets and the products and/or services. Generally, a high degree of overlap is more favorable than a low degree of overlap at least because a high degree of overlap indicates that the assets cover the products and/or services being provided by the borrower. The intellectual-property environment review 518 may also include identifying, determining, and/or generating disposition data 523 indicating competitors and/or potential acquirers of the intellectual property. In these examples, identifying of multiple potential acquirers of the intellectual property may raise the value of the intellectual property and/or may increase the confidence that the intellectual property may be sold in the event that liquidation is desired and/or attempted.

The qualitative intellectual property review 502, the quantitative intellectual property review 510, and/or the intellectual property environment review 518 may be utilized to generate an intellectual property valuation report 530, which may indicate the value(s) of the intellectual property and/or factors associated with the valuation. The intellectual property valuation report may be provided to the borrower, the lender, and/or the insurer, such as during the underwriting portion of the process.

Figure 6:
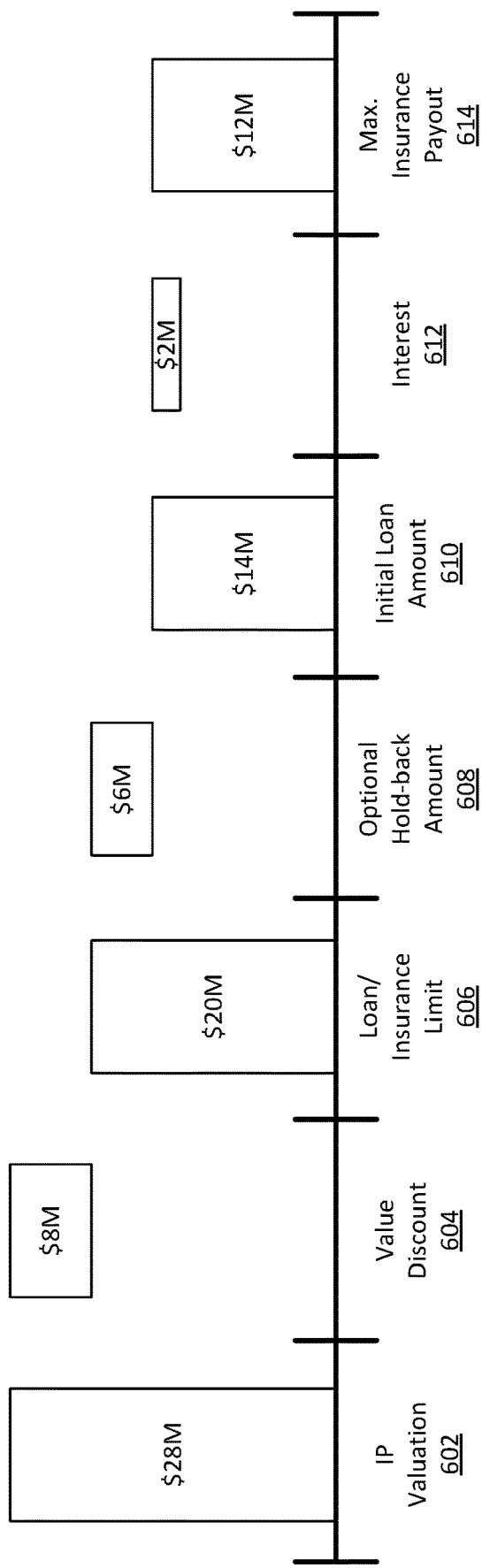
FIG. 6 illustrates a conceptual diagram of loan structuring and/or insurance policy structuring associated with digital property collateral protection.

FIG. 6 illustrates a conceptual diagram of loan structuring and/or insurance policy structuring associated with digital property collateral protection.

For example, an underwriting analysis may include identifying, determining, and/or generating a loan structure between the borrower and the lender. The loan structure may indicate a value 602 of the intellectual property, such as from the valuation described above with respect to FIG. 5. The loan structure may also include a value discount 604, which may represent a portion of the value 602 of the intellectual property and may be based at least in part on one or more factors, such as the quality of the intellectual property, the quality of the borrower, and/or one or more constraints as set by the lender.

A loan/insurance limit 606 may be identified and/or determined based at least in part on the difference between the value 602 and the value discount 604. For example, as shown in FIG. 6, the value 602 of the intellectual property may be $28 million, and the value discount 604 may be, for example, $8 million. In this example, the loan/insurance limit 606 may be $20 million, which is the difference between the $28 million value 602 of the intellectual property and the $8 million value discount 604. Additionally, the loan structure may include a benchmark holdback amount 608, which may be optional and may be a certain amount of the loan/insurance limit 606 that is held back by the lender and is provided to the borrower only if the borrower meets or exceeds certain benchmarks, such revenue goals, asset growth, etc. Staying with the example utilized herein, the benchmark holdback amount 608 may be, for example, $6 million. In this example, the initial loan amount 610, which may include accrued interest, may be $14 million, which is the difference between the $20 million loan/insurance limit 606 and the $6 million benchmark holdback amount 608. Additionally, an indication of the amount of interest 612 associated with the loan may be provided. For example, the interest 612 may be $2 million. In this example, the insurer may issue an insurance policy with a maximum insurance payout 614 of $12 million, which is the difference between the $14 million initial loan amount 610 and the $2 million interest amount 612. As such, if all parties are in agreement, the loan may issue, and the borrower may be provided the $14 million initial loan amount 610 (including accrued interest) by the lender, and the insurer may issue the insurance policy to the lender with the maximum insurance payout 614 of $12 million.

It should be understood that the values used for the various aspects of FIG. 6 are provided by way of example and not by limitation. The values may fluctuate depending on factors associated with the borrower, the lender, the insurer, and/or circumstances surrounding a given deal.

FIGS. 7-10 illustrate processes for digital property collateral protection. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-6, although the processes may be implemented in a wide variety of other environments, architectures and systems.

Figure 7:
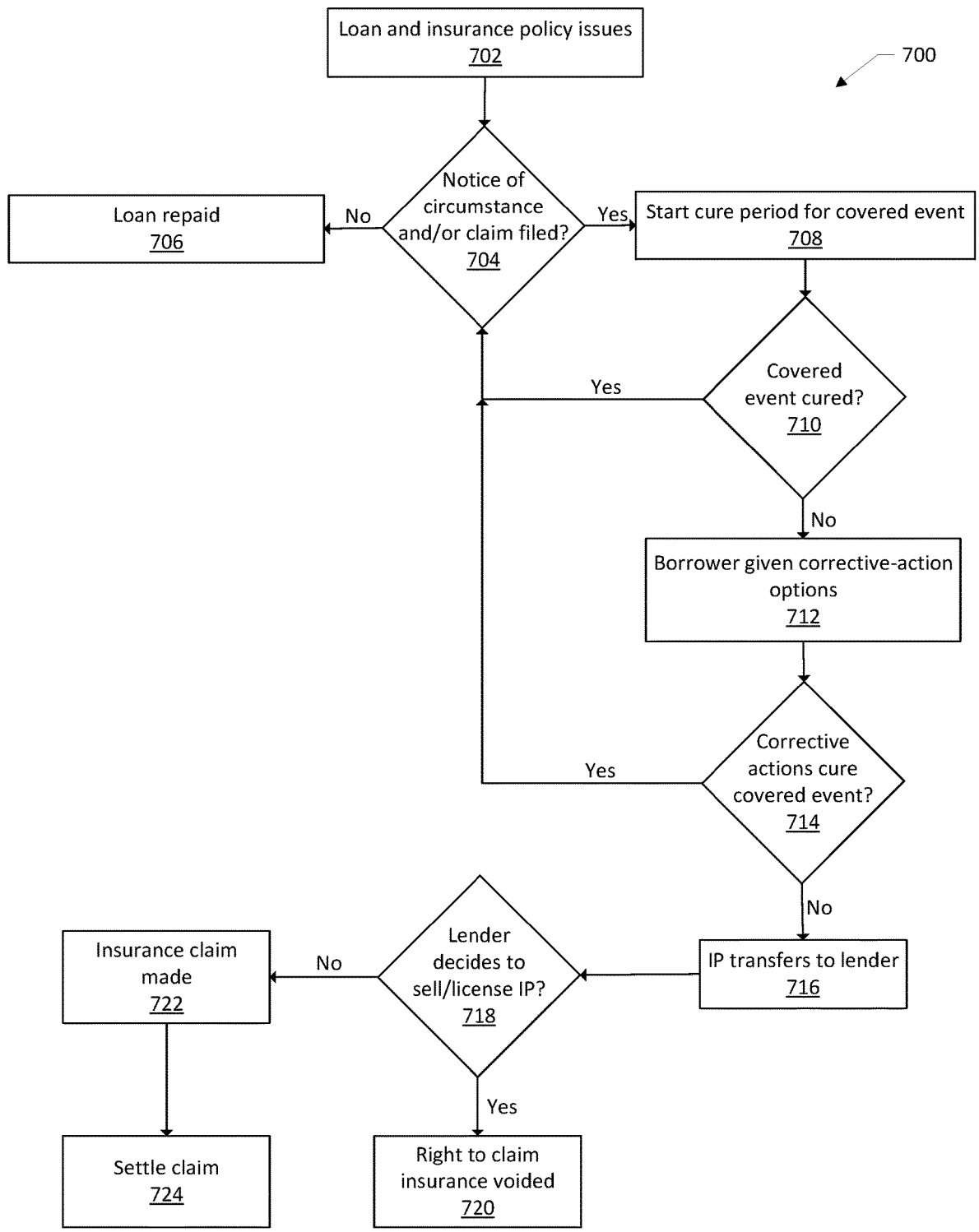
FIG. 7 illustrates a flow diagram of an example process for actions performed post-issuance of an insurance policy associated with digital property collateral protection.

FIG. 7 illustrates a flow diagram of an example process 700 for actions performed post-issuance of an insurance policy associated with digital property collateral protection. The order in which the operations or steps are described is not intended to be construed as a limitation, and any number of the described operations may be combined in any order and/or in parallel to implement process 700. The operations described with respect to the process 700 are described as being performed by one or more individuals and/or teams of individuals. However, it should be understood that some or all of these operations may be performed by some or all of components, devices, and/or systems described herein.

At block 702, the process 700 may include the loan and/or insurance policy issuing. Issuance of the loan and/or insurance policy may be based at least in part on the pre-underwriting and/or underwriting processes and/or analyses described elsewhere herein.

At block 704, the process 700 may include determining whether a covered event has occurred. Determining whether a covered event has occurred may be based at least in part on the occurrence of an event defined in the loan and/or insurance policy as constituting a covered event. For example, the covered event may include the failure to make a payment pursuant to a payment schedule and/or payment period under the loan. Additionally, or alternatively, a covered event may occur if an impairment event occurs. Impairment events may include, for example, a legal claim against the borrower, a government action against the borrower, a third-party action in which the borrower is implicated, a reputational event, a borrower action, and/or bankruptcy of a licensee of the intellectual property. Some or all of these events may be defined by the terms of the loan and/or insurance policy.

For example, a "legal claim" may be defined as a dispute resolution proceeding commenced by a third party against the borrower that challenges the validity of the borrower's rights in, or the value or ownership of, the insured intellectual property, in whole or in part, in a forum having jurisdiction over such proceeding, which proceeding seeks a remedy for (1) defects in any process granting the rights or ownership, including defects in oaths, declarations or other documents required of owners, inventors, authors and others as part of the rights grant process, translations, specification, drawings, deposit materials, statements and evidence of use, (2) defects in any steps taken to establish or maintain rights or ownership outside of any rights granting process, including defects in contractual confidential obligations and defects in security measures taken to maintain secrecy, (3) invalidity, including invalidity on the grounds of ineligible subject matter, lack of utility or technical effect, prior art, lack of originality, lack of functionality, lack of descriptiveness or lack of distinctiveness, (4) any defense asserted by a third party in response to an action by the borrower claiming such third party's infringement of collateralized intellectual property, which defense may include inequitable conduct, express or implied license to use, laches, estoppel and misuse, (5) pre-grant or pre-registration submission of information unfavorable to the borrower's rights or review, including pre-issuance submissions and opposition, (6) post-grant or pre-registration review of the borrower's rights or ownership, including ex parte or inter parties review, business method review, rectification, re-examination, cancellation or revocation proceedings, concurrent use proceeding, interference or applications to amend any registration, grant or other evidence of right, (7) a scope of right unfavorable to the borrower, including an interpretation of claim language or trade dress that would enable third parties to avoid infringement, (8) third party entitlement to a patent, trademark or other right that is in conflict with the borrower's right, (9) that the borrower's right has already been licensed to a third party, including an express license or implied license, (10) that a right is subject to a third party obligation, including a patent right being subject to the intellectual property rights policy of a standards body and being a standards essential patent, (11) governmental grant of a compulsory license, license of right or other exception, (12) an application for a declaration of non-infringement or the borrower's inability to obtain preliminary or permanent injunctive relief, (13) injunctive relief against the borrower, and/or (14) that the borrower has, by the exercise of its rights in the collateralized intellectual property, infringed on or misappropriated the intellectual property of a third party, including patent infringement resulting from the manufacture, sale, or use of the borrower's product(s) or service(s).

A "government action" may include, for example, the implementation of any treaty, law, order, opinion, directive, decree or regulation having the force of law, or the taking of any other action, by any government or state with recognized jurisdiction and powers of enforcement that (1) renders null and void or unenforceable any collateralized intellectual property, in whole or in part, (2) reconsiders a previously granted right included in the collateralized intellectual property, (3) adversely affects the scope, enforceability or other granted rights in the collateralized intellectual property, (4) adversely affects the registration, grant, scope, enforceability or recovery for rights included in the collateralized intellectual property for which registration or application is actively pursued, (5) adversely affects a presumption associated with a granted right included in the collateralized intellectual property, (6) grants to a competitor of the borrower any intellectual property identical in substance and/or content to any of the collateralized intellectual property being processed or applied for on behalf of the borrower, (7) grants to a third party a compulsory license, license of right or other right of exception, (8) prevents the borrower from exploiting the collateralized intellectual property, in whole or in part, and/or (9) cancels any previously issued and valid authority to export or import the borrower's product to or from an given country on the grounds that manufacture, sale, or use of such collateralized intellectual property would infringe upon the intellectual property of a third party.

A "third party action" may include, in addition to a legal claim, any action taken by a third party that includes (1) thefts or damage to the collateralized intellectual property, (2) counterfeiting of given trademarks and/or copyrights, (3) breach of obligation, (4) circumvention of technological protection, and/or (5) sabotage.

A "reputational event" may include an adverse event caused by one or more of the following (1) blackmail and extortion, (2) breach of IT security, (3) counterfeit goods, (4) criminal proceedings, (5) financial statement restatement, (6) food borne illness, (7) industrial espionage, (8) loss of a key executive or developer, (9) major litigation, (10), mass tort, (11) personal endorser, (12) workplace violence, and/or (13) sexual misconduct. In these examples, the event may be required to have a material impact on the borrower.

A "borrower action" may include an action by an employee of the borrower outside of the employee's agency or the borrower's direct control that negatively affects the borrower's reputation, positioning, or customer perception of loyalty, including improper conduct of an officer.

If a covered event has not occurred, then at block 706, the process 700 may include the loan being repaid, such as by the borrower. In these examples, the borrower makes one or more payments under the terms of the loan and does not default on the loan during that term. The borrower completely repays the loan, with the accrued interest, to the lender.

If a covered event occurs, then at block 708, the process 700 may include initiation of a cure period for curing the covered event. The cure period may be defined in the loan documents and/or the insurance policy documents and may provide the borrower with a given amount of time to come into compliance with the terms of the loan, such as making scheduled payments. The borrower may take one or more steps to cure the covered event. In examples, the loan documents may limit and/or specify options for curing the covered event.

At block 710, the process 700 may include determining whether the covered event has been cured by the end of the cure period. In examples where the covered event has been cured, the process 700 may return to block 704, where it may be determined that one or more subsequent covered events occurred. In examples where the covered event has not been cured, the process 700 may continue to block 712, where the borrower may be given corrective-action options. Those options may include, for example, receiving alternative debt, internal stakeholders injecting more funding, equity and/or venture capital fundraising, sale of the collateralized intellectual property and/or other uncollateralized intellectual property to a competitor, and/or licensing of intellectual property to third parties.

At block 714, the process 700 may include determining whether the corrective actions were taken and/or whether the corrective actions cured the covered event. In examples where the corrective actions cured the covered event, the process 700 may return to block 704, where it may be determined that one or more subsequent covered events occurred. In examples where the corrective actions did not cure the covered event, and/or the borrower did not take one or more of the corrective actions, then at block 716 the process 700 may include transferring the intellectual property to the lender from the borrower. This transfer may occur without the interaction of the borrower and may occur pursuant to the terms of the loan agreement.

At block 718, the process 700 may include determining whether the lender has decided to sell and/or license the intellectual property. In examples where the lender decides to sell and/or license the intellectual property, the process 700 may continue to block 720, where the right to make a claim under the insurance policy may be voided. In these examples, the insurance policy may provide the option to the lender to either make an insurance claim or attempt to sell/license the intellectual property. The lender may be incentivized to sell and/or license the intellectual property because the loan amount will be larger than the maximum payout amount under the insurance policy, as discussed more above with respect to FIG. 6. At this point, the broker may provide an updated valuation to the lender. The updated valuation may provide a liquidation valuation for the intellectual property, which may enable the lender to make an informed decision on whether to sell/license the intellectual property or make an insurance claim.

Returning to block 718, in examples where the lender does not decide to sell and/or license the intellectual property, the process 700 may continue to block 722, where an insurance claim may be made by the lender. In these examples, the lender is foregoing the option to sell/license the intellectual property, and in doing so will not receive the interest under the loan.

At block 724, the process 700 may include settling the insurance claim. For example, settling the insurance claim may include transferring the collateralized intellectual property to the insurer. For example, where the lender chooses to liquidate the intellectual property and/or license the intellectual property, the lender's right to make an insurance claim may be voided and the insurance policy may terminate. In examples where the lender chooses to make the insurance claim, the intellectual property may be transferred from the lender to the insurer. The insurance policy may include one or more provisions that may allow for the transfer of the intellectual property in such a circumstance. The valuation provided to the lender may be provided to the insurer and/or a separate valuation may be performed for the insurer. In still other examples, the insurer and the lender may work together prior to the collateralized intellectual property transferring to the insurer to liquid the intellectual property. In instances where the liquidated intellectual property has a value and/or proceed that is less than the claimed amount, the insurer, pursuant to the terms of a given insurance policy, may provide a payout that covers the difference between the payout limit of the policy and the proceed value.

Figure 8:
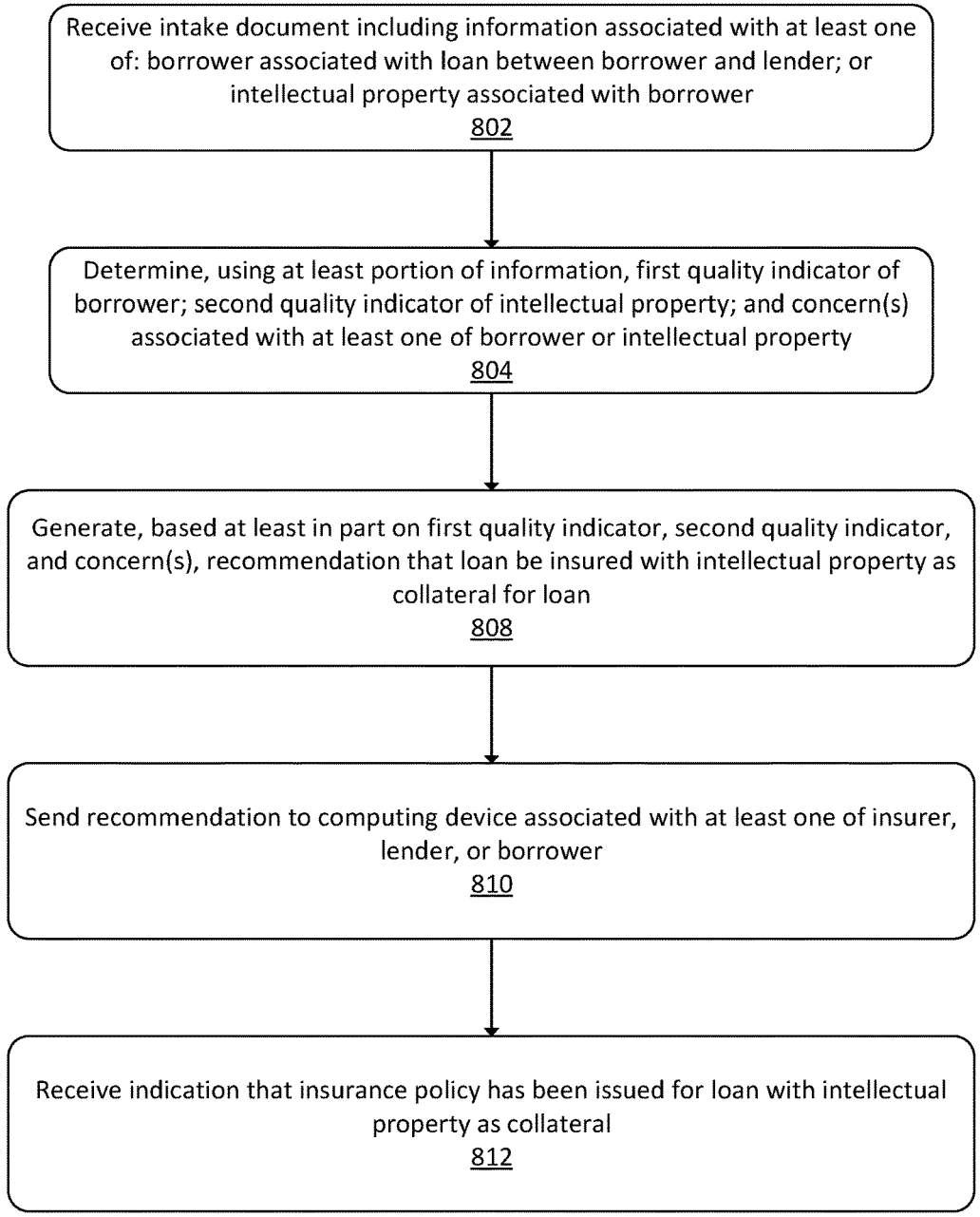
FIG. 8 illustrates a flow diagram of an example process for digital property collateral protection.

FIG. 8 illustrates a flow diagram of an example process 800 for digital property collateral protection. The order in which the operations or steps are described is not intended to be construed as a limitation, and any number of the described operations may be combined in any order and/or in parallel to implement process 800. The operations described with respect to the process 800 are described as being performed by one or more individuals and/or teams of individuals. However, it should be understood that some or all of these operations may be performed by some or all of components, devices, and/or systems described herein.

At block 802, the process 800 may include receiving an intake document including information associated with at least one of: borrower associated with loan between borrower and lender; or intellectual property associated with the borrower. For example, the discovery document, also described herein as an intake document, may request information associated with the borrower and the intellectual property associated with the borrower. For example, the discovery document may request information such as the borrower's name and industry, corporate structure, past ability to receive funding from a venture capital entity and/or a private equity source, corporate ownership structure and/or composition, identification of equity investors and their respective holdings, borrower valuation, pending offers of equity investment, revenue numbers, profit numbers, current contracts that are material to continued and/or initial revenue and/or profits, long-term company goals and/or growth routes, identification of the owner(s) of intellectual property associated with the borrower, assignment documents associated with the intellectual property, and specific information associated with the intellectual property. The information associated with the intellectual property may include a description of the intellectual property associated with the borrowers, identifiers of the intellectual property and/or registration of the intellectual property, the countries in which the intellectual property is protected, a description of the borrower's intellectual property strategy, identification of the individuals and/or firms responsible for management and/or oversight of the borrower's intellectual property portfolio, estimated revenue and profit attributable to the intellectual property, identification and description of intellectual property licensing to third parties, historical exercise of intellectual property rights associated with products and/or services offered by the borrower, description of how revenues and/or profits from intellectual property are distributed by business segment and/or by country, previous valuations of the intellectual property, copies of licenses and/or agreements related to the intellectual property, identification of any known, unlicensed third-party use of the intellectual property, identification of any intellectual property that has been threatened, challenged, and/or subject to administrative and/or judicial actions, copies of standard employment contracts and identification of assignment provisions in those employment contracts, identification of key employees associated with the intellectual property and whether those employees have left the borrower, the borrower's licensing of third-party intellectual property, procedures to avoid infringement of third-party intellectual property rights, whether the borrower has insurance for theft of intellectual property and/or liability for infringement of third-party intellectual property, identification of potential purchasers of the intellectual property, and/or identification of key competitors. Additionally, in examples, the discovery document may request transactional information, such as the amount of the loan sought, an intended use for loan proceeds, identification of the lender, and/or alternative plans if the loan or collateral protection insurance is not available under the terms desired by the borrower.

At block 804, the process 800 may include determining, using at least a portion of the information, a first quality indicator of the borrower, a second quality indicator of the intellectual property, and/or one or more concerns associated with at least one of the borrower or the intellectual property. For example, determining the first quality of the borrower may include, for example, a broking analysis. Loan-origination data, also described herein as a loan-origination mix, may be identified, determined, and/or generated. The loan-origination data may include business-sector information, business-size information, and/or intellectual property content. The business-sector information may indicate, for example, one or more business sectors associated with the borrower. By way of example, the business sectors may include a technology sector, industrial sector, entertainment sector, medical sector, etc. In examples, a borrower may be associated with one sector or with multiple sectors. The business-size information may indicate, for example, an amount of revenue, a number of employees, and/or an amount of profit associated with the borrower. The intellectual property content may include identifiers of the intellectual property assets associated with the borrower as well as the type of intellectual property assets, such as patents, trade secrets, trademarks, copyrights, etc. This loan-origination data may be identified, determined, and/or generated utilizing the information from the discovery document and/or the publicly-available resources.

Additionally, for those borrowers that clear the broking analysis, a qualitative valuation analysis may be performed utilizing the loan-origination data and/or insurance-input data and/or the results from the broking analysis. For example, a valuation agent may perform the qualitative valuation analysis, which may include identifying and/or determining information such as whether the intellectual property is owned by the borrower, whether there are any disputes involving the intellectual property, whether those disputes appear unfavorable, whether the intellectual property is proven to at least have a potential to generate profit and/or revenue, whether the intellectual property assets appear insubstantial relative to the business and/or loan, whether the intellectual property is aligned with the business, the status of the intellectual property assets, the degree of intellectual property asset commercialization, and/or the presence of licensing agreements associated with the intellectual property. Additionally, in some examples, one or more priorities of the broker system may be applied to the qualitative valuation analysis. Those priorities may include the intellectual property portfolios having at least a threshold number of patents in a given country, patent coverage in other countries and particularly in countries associated with the business of the borrower 110, whether the intellectual property portfolio is growing and/or a rate of growth, licensing revenue thresholds, and/or sufficient secondary fields of use for the intellectual property.

At block 806, the process 800 may include generating, based at least in part on the first quality indicator, the second quality indicator, and/or the one or more concerns, a recommendation that the loan be insured with the intellectual property as collateral for the loan. For example, depending on the first quality indicator, the second quality indicator, and/or a valuation of the intellectual property, a borrower may be more or less desirable as a candidate for a loan with the intellectual property as collateral. The borrower may be assigned a score, and/or the information may be utilized without a formal score to determine whether the profile supports or does not support the loan to be insured with the intellectual property is collateral.

At block 808, the process 800 may include sending the recommendation to a computing device associated with at least one of an insurer, the lender, or the borrower. Additionally, material information associated with the profile may be provided to the lender and/or the insurer. For example, the material information may be utilized to identify, determine, and/or generate a loan structure between the borrower and the lender.

At block 810, the process 800 may include receiving an indication that an insurance policy has been issued for the loan with the intellectual property as the collateral. For example, if the borrower, lender, and insurer agree to the terms of the deal, one or more of these entities may provide an indication stating as much to the broker.

Additionally, or alternatively, the process 800 may include determining the first quality of the borrower based at least in part on an ownership structure of the borrower, one or more previous debt arrangements, one or more previous equity arrangements, a type of the intellectual property, a number of assets associated with the intellectual property, a revenue value associated with the intellectual property, a loan amount sought for the loan or the potential loan, and a stated use for funds from the loan or the potential loan. The process 800 may also include determining the second quality and the one or more concerns based at least in part on a status of the intellectual property, an owner of the intellectual property, a legal claim associated with the intellectual property, a degree of commercialization of the intellectual property, and one or more licensing agreements associated with the intellectual property.

Additionally, or alternatively, the process 800 may include determining a value associated with the intellectual property, the value based at least in part on: a qualitative analysis of a degree of coverage of the intellectual property, a degree of opportunity to expand the intellectual property, and a degree of exposure associated with the intellectual property; and/or a quantitative analysis of the value at liquidation, at a maximum value, and at a minimum value. In these examples, generating the profile may be based at least in part on the value.

Additionally, or alternatively, the process 800 may include receiving a third indication that the borrower has failed to comply with the terms of the loan and providing, to the lender, an analysis of the intellectual property at the time of or after receiving the third indication, the analysis recommending a liquidation price for the intellectual property. The process 800 may also include receiving a fourth indication that the lender has made an insurance claim associated with the insurance policy and providing the analysis to the insurer.

Additionally, or alternatively, the process 800 may include determining one or more terms for the loan based at least in part on the information, the terms including an intellectual-property transfer provision for transferring the intellectual property to the lender upon occurrence of an IP-transfer event defined in the loan.

Additionally, or alternatively, the process 800 may include monitoring the intellectual property and one or more aspects of the borrower during a term of the loan, the monitoring based at least in part on reports received from the borrower and data received from one or more network resources. The process 800 may also include determining, based at least in part on results from the monitoring, that a first value of the collateral during the term of the loan is within a threshold amount of a second value of the collateral at the initiation of the loan.

Figure 9:
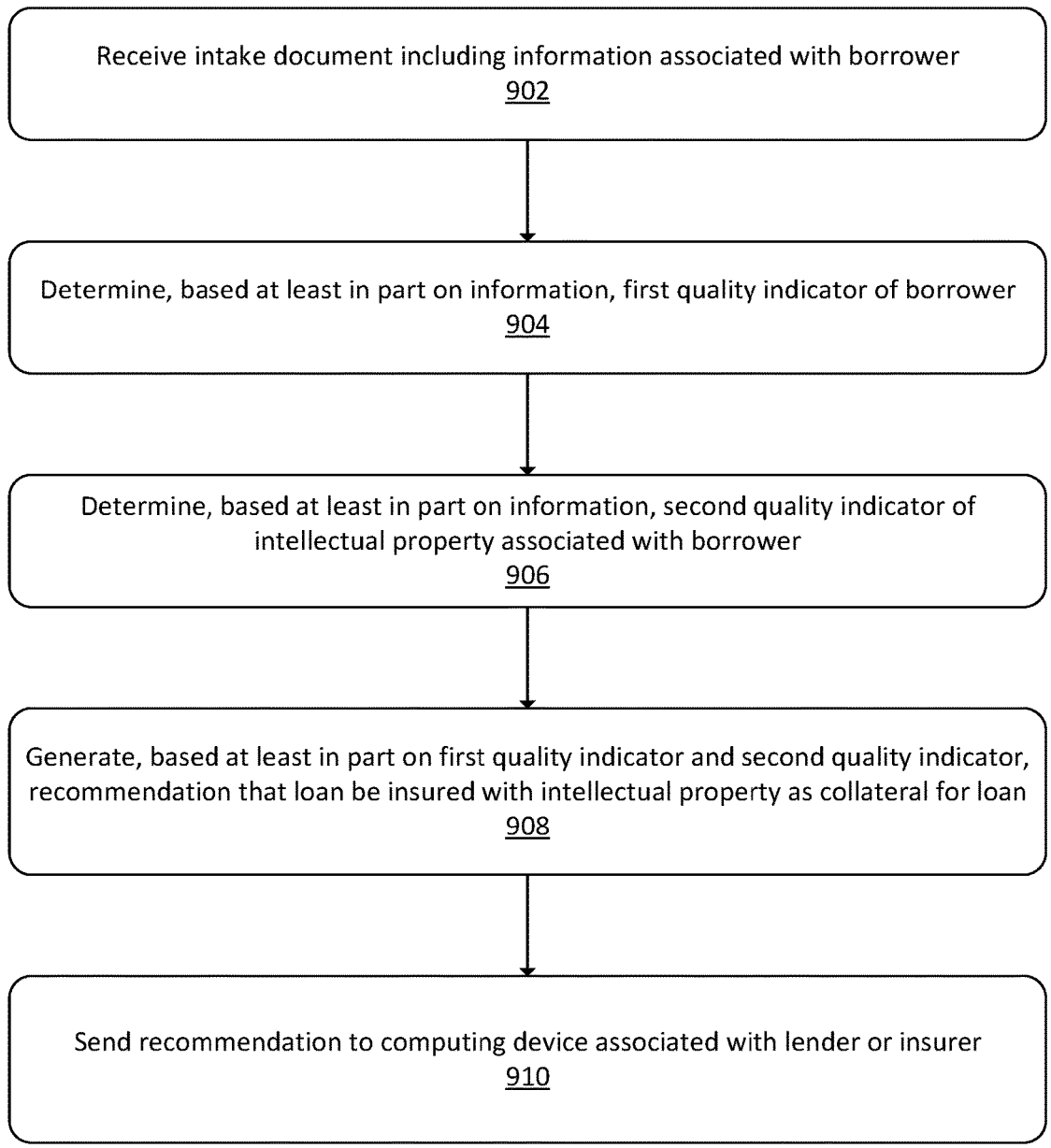
FIG. 9 illustrates a flow diagram of another example process for digital property collateral protection.

FIG. 9 illustrates a flow diagram of another example process 900 for digital property collateral protection. The order in which the operations or steps are described is not intended to be construed as a limitation, and any number of the described operations may be combined in any order and/or in parallel to implement process 900. The operations described with respect to the process 900 are described as being performed by one or more individuals and/or teams of individuals. However, it should be understood that some or all of these operations may be performed by some or all of components, devices, and/or systems described herein.

At block 902, the process 900 may include receiving an intake document including information associated with a borrower. For example, the discovery document, also described herein as an intake document, may request information associated with the borrower and the intellectual property associated with the borrower. For example, the discovery document may request information such as the borrower's name and industry, corporate structure, past ability to receive funding from a venture capital entity and/or a private equity source, corporate ownership structure and/or composition, identification of equity investors and their respective holdings, borrower valuation, pending offers of equity investment, revenue numbers, profit numbers, current contracts that are material to continued and/or initial revenue and/or profits, long-term company goals and/or growth routes, identification of the owner(s) of intellectual property associated with the borrower, assignment documents associated with the intellectual property, and specific information associated with the intellectual property. The information associated with the intellectual property may include a description of the intellectual property associated with the borrowers, identifiers of the intellectual property and/or registration of the intellectual property, the countries in which the intellectual property is protected, a description of the borrower's intellectual property strategy, identification of the individuals and/or firms responsible for management and/or oversight of the borrower's intellectual property portfolio, estimated revenue and profit attributable to the intellectual property, identification and description of intellectual property licensing to third parties, historical exercise of intellectual property rights associated with products and/or services offered by the borrower, description of how revenues and/or profits from intellectual property are distributed by business segment and/or by country, previous valuations of the intellectual property, copies of licenses and/or agreements related to the intellectual property, identification of any known, unlicensed third-party use of the intellectual property, identification of any intellectual property that has been threatened, challenged, and/or subject to administrative and/or judicial actions, copies of standard employment contracts and identification of assignment provisions in those employment contracts, identification of key employees associated with the intellectual property and whether those employees have left the borrower, the borrower's licensing of third-party intellectual property, procedures to avoid infringement of third-party intellectual property rights, whether the borrower has insurance for theft of intellectual property and/or liability for infringement of third-party intellectual property, identification of potential purchasers of the intellectual property, and/or identification of key competitors. Additionally, in examples, the discovery document may request transactional information, such as the amount of the loan sought, an intended use for loan proceeds, identification of the lender, and/or alternative plans if the loan or collateral protection insurance is not available under the terms desired by the borrower.

At block 904, the process 900 may include determining, based at least in part on the information, a first quality indicator of the borrower. For example, determining the first quality of the borrower may include, for example, a broking analysis. Loan-origination data, also described herein as a loan-origination mix, may be identified, determined, and/or generated. The loan-origination data may include business-sector information, business-size information, and/or intellectual property content. The business-sector information may indicate, for example, one or more business sectors associated with the borrower. By way of example, the business sectors may include a technology sector, industrial sector, entertainment sector, medical sector, etc. In examples, a borrower may be associated with one sector or with multiple sectors. The business-size information may indicate, for example, an amount of revenue, a number of employees, and/or an amount of profit associated with the borrower. The intellectual property content may include identifiers of the intellectual property assets associated with the borrower as well as the type of intellectual property assets, such as patents, trade secrets, trademarks, copyrights, etc. This loan-origination data may be identified, determined, and/or generated utilizing the information from the discovery document and/or the publicly-available resources.

At block 906, the process 900 may include determining, based at least in part on the information, a second quality indicator of intellectual property associated with the borrower. For example, for those borrowers that clear the broking analysis, a qualitative valuation analysis may be performed utilizing the loan-origination data and/or insurance-input data and/or the results from the broking analysis. For example, a valuation agent may perform the qualitative valuation analysis, which may include identifying and/or determining information such as whether the intellectual property is owned by the borrower, whether there are any disputes involving the intellectual property, whether those disputes appear unfavorable, whether the intellectual property is proven to at least have a potential to generate profit and/or revenue, whether the intellectual property assets appear insubstantial relative to the business and/or loan, whether the intellectual property is aligned with the business, the status of the intellectual property assets, the degree of intellectual property asset commercialization, and/or the presence of licensing agreements associated with the intellectual property. Additionally, in some examples, one or more priorities of the broker system may be applied to the qualitative valuation analysis. Those priorities may include the intellectual property portfolios having at least a threshold number of patents in a given country, patent coverage in other countries and particularly in countries associated with the business of the borrower 110, whether the intellectual property portfolio is growing and/or a rate of growth, licensing revenue thresholds, and/or sufficient secondary fields of use for the intellectual property.

At block 908, the process 900 may include generating, based at least in part on the first quality indicator and the second quality indicator, a recommendation that the loan be insured with the intellectual property as collateral for the loan. For example, depending on the first quality indicator, the second quality indicator, and/or a valuation of the intellectual property, a borrower may be more or less desirable as a candidate for a loan with the intellectual property as collateral. The borrower may be assigned a score, and/or the information may be utilized without a formal score to determine whether the profile supports or does not support the loan to be insured with the intellectual property is collateral.

At block 910, the process 900 may include sending the recommendation to a computing device associated with a lender or an insurer. In examples, the recommendation may include a value of the intellectual property, a value discount representing a percentage of the value and based at least in part on the second quality, a maximum loan amount based at least in part on a difference between the value and the value discount, an initial loan amount representing a percentage of the maximum loan amount, one or more benchmarks to achieve to increase a loan amount from the initial loan amount to the maximum loan amount, an interest amount, and/or an initial payout amount representing a difference between the initial loan amount and the interest amount.

Additionally, or alternatively, the process 900 may include determining the first quality based at least in part on at least one of an ownership structure of the borrower, one or more previous debt arrangements, one or more previous equity arrangements, a type of the intellectual property, a number of assets associated with the intellectual property, a revenue value associated with the intellectual property, a loan amount sought for the loan, or a stated use for funds from the loan.

Additionally, or alternatively, the process 900 may include determining the second quality based at least in part on at least one of a status of the intellectual property, an owner of the intellectual property, a legal claim associated with the intellectual property, a degree of commercialization of the intellectual property, or one or more licensing agreements associated with the intellectual property.

Additionally, or alternatively, the process 900 may include determining a value associated with the intellectual property, the value based at least in part on a degree of coverage of the intellectual property, a degree of opportunity to expand the intellectual property, a degree of exposure associated with the intellectual property, an estimated value of the intellectual property at liquidation, a maximum value of the intellectual property, and/or a minimum value of the intellectual property. In these examples, generating the profile may be based at least in part on the value.

Additionally, or alternatively, the process 900 may include the first quality being performed by at least one of a first system or a first individual and the second quality being performed by at least one of a second system or a second individual. In these examples, a communication barrier may be established between the at least one of the first system or the first individual and the at least one of the second system or the second individual. The communication barrier may correspond to at least one of a policy or a technology mechanism to reduce communication between the at least one of the first system or the first individual and the at least one of the second system or the second individual.

Additionally, or alternatively, the process 900 may include determining one or more terms for the loan based at least in part on the information, the first quality, and the second quality. In these examples, the one or more terms may include at least one of a loan amount, a cure period associated with a covered event, and an intellectual-property transfer provision for transferring the intellectual property to the lender upon occurrence of an IP-transfer event defined in the loan.

Additionally, or alternatively, the process 900 may include generating loan-origination data indicating a business sector associated with the borrower, a business size associated with the borrower, and intellectual-property content including one or more types of the intellectual property. The process 900 may also include generating, based at least in part on the loan-origination data, insurance-input data indicating a criticality of the intellectual property to the business sector, a market-share value, and a prevalence of each of the one or more types of the intellectual property. In these examples, at least one of the first quality or the second quality may be based at least in part on the insurance-input data.

FIG. 10 illustrates a flow diagram of another example process 1000 for digital property collateral protection. The order in which the operations or steps are described is not intended to be construed as a limitation, and any number of the described operations may be combined in any order and/or in parallel to implement process 1000. The operations described with respect to the process 1000 are described as being performed by one or more individuals and/or teams of individuals. However, it should be understood that some or all of these operations may be performed by some or all of components, devices, and/or systems described herein.

At block 1002, the process 1000 may include generating, based at least in part on a first quality indicator of a borrower and a second quality indicator of intellectual property associated with the borrower, a recommendation that the loan be insured with the intellectual property as collateral for the loan. For example, depending on the first quality, the second quality, and/or a valuation of the intellectual property, a borrower may be more or less desirable as a candidate for a loan with the intellectual property as collateral. The borrower may be assigned a score, and/or the information may be utilized without a formal score to determine whether the profile supports or does not support the loan to be insured with the intellectual property is collateral.

At block 1004, the process 1000 may include sending the recommendation to a computing device associated with the lender or the insurer. In examples, the recommendation may include a value of the intellectual property, a value discount representing a percentage of the value and based at least in part on the second quality, a maximum loan amount based at least in part on a difference between the value and the value discount, an initial loan amount representing a percentage of the maximum loan amount, one or more benchmarks to achieve to increase a loan amount from the initial loan amount to the maximum loan amount, an interest amount, and/or an initial payout amount representing a difference between the initial loan amount and the interest amount.

At block 1006, the process 1000 may include receiving an indication that the insurance policy has been issued by the insurer to the lender for the loan with the intellectual property as the collateral. For example, if the borrower, lender, and insurer agree to the terms of the deal, one or more of these entities may provide an indication stating as much to the broker.

Additionally, or alternatively, the process 1000 may include monitoring the intellectual property and one or more aspects of the borrower during a term of the loan, the monitoring based at least in part on reports received from the borrower and data received from one or more network resources. The process 1000 may also include determining, based at least in part on results from the monitoring, that a first value of the collateral during the term of the loan is within a threshold amount of a second value of the collateral at the initiation of the loan.

Additionally, or alternatively, the process 1000 may include monitoring the intellectual property and one or more aspects of the borrower during a term of the loan, the monitoring based at least in part on reports received from the borrower and data received from one or more network resources. The process 1000 may also include determining, based at least in part on results from the monitoring, that a first value of the collateral during the term of the loan is less than a threshold amount below a second value of the collateral at the initiation of the loan, and sending, to at least one of the lender or the insurer, a report indicating that the first value is less than the threshold amount below the second value.

Additionally, or alternatively, the process 1000 may include receiving a second indication that the borrower has failed to comply with the terms of the loan, and providing, to the lender, an analysis of the intellectual property at the time of or after receiving the second indication, the analysis recommending a liquidation price for the intellectual property. The process 1000 may also include receiving a third indication that the lender has made an insurance claim associated with the insurance policy, and providing, to the insurer and based at least in part on receiving the third indication, the analysis.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system, comprising:
    one or more processors; and
    non-transitory computer-readable media storing computer-executable instructions that, when executed by the one or more processors, cause the one or more processors to perform operations comprising:
        generating, based at least in part on a first quality indicator of a borrower and a second quality indicator of intellectual property associated with the borrower, a command including a recommendation that a loan be insured with the intellectual property as collateral for the loan, wherein the second quality indicator is based at least in part on:
            a qualitative analysis of a degree of coverage of the intellectual property, a degree of opportunity to expand the intellectual property, and a degree of exposure associated with the intellectual property; and
            a quantitative analysis of a value at liquidation, at a maximum value, and at a minimum value;
        sending the command including the recommendation to a computing device associated with a lender or an insurer;
        receiving an indication that an insurance policy has been issued by the insurer to the lender for the loan with the intellectual property as the collateral, the command configured to cause a set of input fields associated with the recommendation to be displayed automatically; and
        automatically monitoring data across multiple datasets associated with the borrower and the intellectual property over a period of time associated with the loan, the monitoring configured to determine whether one or more trigger events indicating a material change in the value have occurred.

2. The system of claim 1, the operations further comprising:
    receiving one or more reports from the borrower, the one or more reports including updated information associated with one or more aspects of the borrower; and
    determining, based at least in part on the one or more reports, that a first value of the collateral during a term of the loan is within a threshold amount of a second value of the collateral at initiation of the loan.

3. The system of claim 1, the operations further comprising:
    receiving one or more reports from the borrower, the one or more reports including updated information associated with one or more aspects of the borrower; and
    determining, based at least in part on the one or more reports, that a first value of the collateral during the term of the loan is a threshold amount below a second value of the collateral at the initiation of the loan; and
    sending, to at least one of the lender or the insurer, a report indicating that the first value is the threshold amount below the second value.

4. The system of claim 1, wherein the recommendation includes:
    the value of the intellectual property;
    a value discount representing a portion of the value and based at least in part on the second quality;
    a maximum loan amount based at least in part on a difference between the value and the value discount;
    an initial loan amount representing a portion of the maximum loan amount;
    an indicator of a benchmark to achieve to increase a loan amount from the initial loan amount to the maximum loan amount;
    an interest amount; and
    an initial payout amount representing a difference between the initial loan amount and the interest amount.

5. The system of claim 1, wherein the indication comprises a first indication, and the operations further comprise:
    receiving a second indication that the borrower has failed to comply with a term associated with the loan;
    providing, to the lender, an analysis of the intellectual property at the time of or after receiving the second indication, the analysis recommending a liquidation price for the intellectual property;

receiving a third indication that the lender has made an insurance claim associated with the insurance policy; and providing, to the insurer and based at least in part on receiving the third indication, the analysis.

6. The system of claim 1, the operations further comprising:

determining, during a term of the loan, that an impairment event has occurred, the impairment event including at least one of a legal claim involving the borrower, a government action involving the borrower, a third-party action associated with the borrower, a reputational event involving the borrower, or a bankruptcy event associated with a licensee of the borrower; and sending, to the computing device associated with the lender or the insurer, a report indicating that the impairment event has occurred.

7. The system of claim 1, wherein:

determining the first quality indicator of the borrower comprises determining the first quality indicator of the borrower based at least in part on an ownership structure of the borrower, one or more previous debt arrangements, one or more previous equity arrangements, a type of the intellectual property, a number of assets associated with the intellectual property, a revenue value associated with the intellectual property, a loan amount sought for the loan or the potential loan, and a stated use for funds from the loan or the potential loan; and determining the second quality indicator comprises determining the second quality indicator based at least in part on a status of the intellectual property, an owner of the intellectual property, a legal claim associated with the intellectual property, a degree of commercialization of the intellectual property, and one or more licensing agreements associated with the intellectual property.

8. The system of claim 1, the operations further comprising determining one or more terms for the loan, the one or more terms including an intellectual-property transfer provision for transferring the intellectual property to the lender upon occurrence of an IP-transfer event defined in the loan.

9. The system of claim 1, wherein the value is determined based at least in part on at least one of a status of the intellectual property, an owner of the intellectual property, a legal claim associated with the intellectual property, a degree of commercialization of the intellectual property, or one or more licensing agreements associated with the intellectual property.

10. The system of claim 1, wherein:

the first quality indicator is determined by at least one of a first system or a first individual;

the value is determined by at least one of a second system or a second individual; and a communication barrier is established between the at least one of the first system or the first individual and the at least one of the second system or the second individual, wherein the communication barrier corresponds to at least one of a policy or a technology mechanism to reduce communication between the at least one of the first system or the first individual and the at least one of the second system or the second individual.

11. The system of claim 1, the operations further comprising:

generating loan-origination data indicating a business sector associated with the borrower, a business size associated with the borrower, and intellectual-property content including one or more types of the intellectual property;

generating, based at least in part on the loan-origination data, insurance-input data indicating a criticality of the intellectual property to the business sector, a market-share value, and a prevalence of each of the one or more types of the intellectual property; and wherein at least one of the first quality indicator or the second quality indicator is based at least in part on the insurance-input data.

\* \* \* \* \*